(12) United States Patent
Muramatsu

(10) Patent No.: US 8,329,349 B2
(45) Date of Patent: Dec. 11, 2012

(54) FUEL CELL SYSTEM AND OPERATING METHOD THEREOF

(75) Inventor: Yasuyuki Muramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1080 days.

(21) Appl. No.: 11/616,396

(22) Filed: Dec. 27, 2006

(65) Prior Publication Data

US 2007/0178343 A1 Aug. 2, 2007

(30) Foreign Application Priority Data

Dec. 28, 2005 (JP) ................................ 2005-379571

(51) Int. Cl.
*H01M 8/04* (2006.01)
(52) U.S. Cl. ............. 429/428; 429/427; 429/61; 429/62
(58) Field of Classification Search .................... 429/22, 429/13, 9; 180/271, 279, 284
See application file for complete search history.

(56) References Cited

U.S. PATENT DOCUMENTS

| | | | | |
|---|---|---|---|---|
| 6,591,924 | B2 * | 7/2003 | Shimizu | 180/65.1 |
| 2004/0170876 | A1 * | 9/2004 | Ozeki | 429/22 |
| 2004/0224198 | A1 | 11/2004 | Ninomiya et al. | |

FOREIGN PATENT DOCUMENTS

| | | | |
|---|---|---|---|
| CN | 1495950 A | | 5/2004 |
| EP | 1455402 | * | 2/2004 |
| EP | 1447872 A1 | | 8/2004 |
| EP | 1455402 A | | 9/2004 |
| JP | 2001-357863 A | | 12/2001 |
| JP | EP1455402 | * | 2/2004 |
| JP | 2004-11212 | * | 4/2004 |
| JP | 2004-111212 A | | 4/2004 |
| JP | 2004-152617 A | | 5/2004 |
| JP | 2004-111212 | * | 8/2004 |
| JP | 2004-227139 A | | 8/2004 |
| JP | 2004-349110 A | | 12/2004 |
| JP | 2004-355902 A | | 12/2004 |
| WO | 2004/103763 A1 | | 12/2004 |

OTHER PUBLICATIONS

Official communication issued in the counterpart European Application No. 06027017.0, mailed on Apr. 5, 2007.
Official Communication issued in corresponding Chinese Patent Application No. 2006101714381, mailed on Jun. 26, 2009.
Official Communication issued in corresponding European Patent Application No. 06027017.0, mailed on Feb. 25, 2010.

* cited by examiner

*Primary Examiner* — Melvin C Mayes
*Assistant Examiner* — Colette Nguyen
(74) *Attorney, Agent, or Firm* — Keating & Bennett, LLP

(57) ABSTRACT

A fuel cell system and an operation method thereof are capable of re-starting the system reliably even after the system has been tilted to or beyond a predetermined limit. The fuel cell system includes a fuel cell having an anode and a cathode. A tilt sensor detects a tilt of the fuel cell system not smaller than a predetermined limit, and a memory stores a record that the fuel cell system was tilted to or beyond the predetermined limit. When the fuel cell is started thereafter, the fuel cell is started in a recovery mode if there is a record of a tilt not smaller than the predetermined limit in the memory. The fuel cell is not started, however, if a tilt time since the detection of the tilt of the fuel cell system not smaller than the predetermined limit is not smaller than a first predetermined value.

21 Claims, 19 Drawing Sheets

FIG. 12

Relationship Between Tilt Time and Stand-by Time

| Tilt Time | Less than 1 Minute | Not less than 1 Minute, Less than 1 Hour | Not less than 1 Hour, Less than 24 Hours | Not less than 24 Hours, Less than 60 Days | Not less than 60 Days |
|---|---|---|---|---|---|
| Stand-by Time | 2 Minutes | 5 Minutes | 10 Minutes | 4 Hours | Display "Error" |

F I G. 1 3
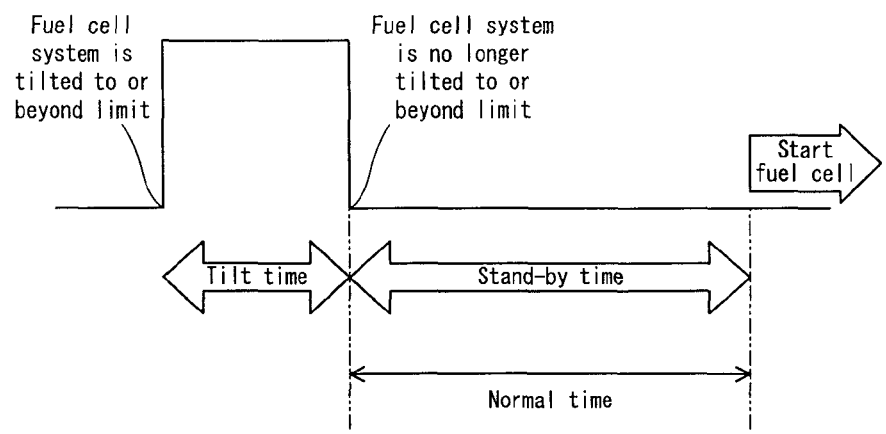

FUEL CELL SYSTEM AND OPERATING METHOD THEREOF

BACKGROUND OF THE INVENTION

1. Field of the Invention

The present invention relates to fuel cell systems and operating methods thereof. More specifically, the present invention relates to a fuel cell system that controls a re-starting operation of the fuel cell after a rollover of the fuel cell, and an operating method thereof.

2. Description of the Related Art

Direct methanol fuel cell systems are superior to other fuel cell systems in terms of their smaller size and lighter weight, and are used suitably for riding-type vehicles such as motorbikes.

In direct methanol fuel cell systems, an electrolyte film provided by a solid polymer film is provided in the fuel cell. Aqueous methanol solution is supplied by an aqueous solution pump from an aqueous solution tank to an anode of the fuel cell and simultaneously, air which contains oxygen is supplied to a cathode by an air pump. After the reactions in the fuel cell, unused methanol, water and carbon dioxide are discharged from the anode and returned to the aqueous solution tank while unused air and water are discharged from the cathode and are supplied to a water tank. In the aqueous solution tank, carbon dioxide is separated from liquid whereas unused air is separated from liquid in the water tank.

Generally, when the direct methanol fuel cell system as described is tilted excessively due to a rollover or the like, the following problems arise. For example, exhaust pipes for the gas/liquid separation in the water tank and in the aqueous solution tank are blocked, disabling the gas/liquid separation, or air is trapped in the aqueous solution pump, disabling circulation of the aqueous methanol solution. These events make impossible to continue power generation, causing problems such as unnecessary consumption of electric power by the system components. A problem also occurs in fuel cell systems that use hydrogen as the fuel. In this case water is trapped in the cathode.

JP-A 2004-111212 discloses a fuel cell system that detects a rollover with a tilt sensor and is capable of stopping the system when a rollover is detected. This enables to prevent unnecessary use of electric power.

However, JP-A 2004-111212 does not disclose a detailed method of re-starting after the stoppage due to rollover, mentioning only that system status is checked before the re-start.

A rollover can cause problems. For example, water and aqueous methanol solution are trapped on the cathode side, aqueous methanol solution on the anode side drains and the electrolyte film is dried. These problems pose difficulties in the subsequent re-start, but nothing is disclosed about how these problems may be solved.

SUMMARY OF THE INVENTION

In order to overcome the problems described above, preferred embodiments of the present invention provide a fuel cell system capable of re-starting reliably even after the system has been tilted to or beyond a limit due to rollover, for example, as well as providing an operating method thereof.

According to a preferred embodiment of the present invention, a fuel cell system includes a fuel cell which includes an anode and a cathode; a tilt detector arranged to detect a tilt of the fuel cell system; a storage device arranged to store tilt information representing a result of detection by the tilt detector; and a controller arranged to start the fuel cell in one of start-up modes including a normal mode and a recovery mode based on the tilt information stored in the storage device.

According to another preferred embodiment of the present invention, a method of operating a fuel cell system that includes a fuel cell having an anode and a cathode. The method includes steps of detecting a tilt of the fuel cell system; storing a record in a storage device that the fuel cell system was tilted to or beyond a predetermined limit; and starting the fuel cell, thereafter, in a recovery mode if there is a record of a tilt of the fuel cell system not smaller than a predetermined limit in the storage device at the time of start up.

According to preferred embodiments of the present invention, it is possible to re-start the fuel cell reliably even after the fuel cell system was tilted to or beyond a predetermined limit due to a rollover for example, by starting the system in the recovery mode if the storage device has a record of the tilt of the fuel cell system not smaller than a predetermined limit.

Preferably, operation of the fuel cell is controlled based on a result of detection by the tilt detector. In this case, it becomes possible to prevent risks that accompany continued power generating operation when the fuel cell system is tilted to or beyond the predetermined limit, by stopping operation of the fuel cell if the fuel cell system is tilted to or beyond the predetermined limit.

Further preferably, the fuel cell system further includes a time detector arranged to detect a tilt time since the tilt detector detected a tilt not smaller than a predetermined limit, and starting of the fuel cell is controlled based on the tilt time. The fuel cell is not started if the tilt time is not smaller than a first predetermined value.

The fuel cell system that is tilted to or beyond a predetermined limit is subject to problems. For example, liquid can find ways into places where it should not, leading to a decreased level of liquid in the aqueous solution tank. As another example, the electrolyte film, which should always be in contact with aqueous solution, can dry up as aqueous solution drains. If the tilt not smaller than a predetermined limit lasts only for a short period of time, the problem of dried electrolyte film is solved by wetting the film with aqueous solution again. However, if a tilt not smaller than a predetermined limit lasts for a long time, wetting the electrolyte film with aqueous solution thereafter may not solve the problem of dried film. Further, the electrolyte film can be permanently damaged if it is used forcibly for power generation. By not starting the system if the tilt time is long, i.e. not less than the first predetermined value as described above, it is possible to protect the electrolyte film.

Further preferably, the fuel cell system further includes an instruction unit arranged to issue a power generation start instruction, and power generation is started at least after a lapse of stand-by time following an issuance of the power generation start instruction from the instruction unit when starting the fuel cell in the recovery mode. In this case, it is possible to restore the normal state of gas/liquid separation in the fuel cell system before starting the power generation, as well as to wet and restore the dried electrolyte film back to a normal state.

Further preferably, power generation is started at least after a lapse of stand-by time following a most recent detection by the tilt detector of an event that the tilt of the fuel cell system has no longer been not smaller than a predetermined limit when starting the fuel cell in the recovery mode. In this case, it is possible to restore the normal state of gas/liquid separation in the fuel cell system before starting the power generation, as well as to wet and restore the dried electrolyte film back to a normal state.

Further, preferably, the fuel cell system further includes an air supply arranged to supply the cathode of the fuel cell with air which contains oxygen, and the air supply is controlled so as to supply the cathode with the air which contains oxygen continuously for a predetermined period of time before tapping electric power from the fuel cell when starting the fuel cell in the recovery mode. In this case, it becomes possible to promote discharging of water from the cathode by driving the air supply. In normal operation, the air supply is controlled in accordance with the fuel cell temperature, but in the recovery mode the air supply operation is continued for a predetermined period of time regardless of the temperature condition, which enables to promote discharging of unnecessary water from the cathode.

Preferably, the air supply is controlled so as to supply the cathode with a less amount of air than in power generation continuously for a predetermined period of time before tapping electric power from the fuel cell when starting the fuel cell in the recovery mode. In this case, it is possible to prevent such a problem that too much power is spent for driving the air supply, which will cause system shutdown due to over current.

Preferably, the fuel cell system further includes a water reservoir arranged to store water discharged from the cathode of the fuel cell; an aqueous solution reservoir connected with the water reservoir and arranged to store aqueous fuel solution supplied to the fuel cell; a water supply arranged to supply the water from the water reservoir to the aqueous solution reservoir; and an aqueous solution amount detector arranged to detect an amount of liquid in the aqueous solution reservoir. With the above components, operation of the water supply is controlled based on the amount of liquid in the aqueous solution reservoir when starting the fuel cell in the recovery mode. In this case, the amount of liquid in the aqueous solution reservoir is increased by supplying water from the water reservoir if the amount of liquid in the aqueous solution reservoir is smaller than the second predetermined value.

A tilt of the fuel cell system to or beyond a predetermined limit is likely to cause aqueous solution to flow out of the aqueous solution reservoir into the water reservoir, decreasing the amount of liquid in the aqueous solution reservoir and causing a shortage of the liquid. If this happens, the amount of liquid in the aqueous solution reservoir can be restored by returning water from the water reservoir.

Further preferably, the fuel cell system further includes a liquid amount detector arranged to detect an amount of liquid in the water reservoir. With this arrangement, a concentration of aqueous fuel solution supplied to the fuel cell is controlled based on the amount of liquid in the water reservoir when starting the fuel cell in the recovery mode. In this case, the concentration of the aqueous fuel solution supplied to the fuel cell is increased if the amount of liquid in the water reservoir is lower than a third predetermined value.

A tilt of the fuel cell system to or beyond a predetermined limit is likely to allow water to escape from the water reservoir and decrease the amount of liquid. By increasing the concentration of aqueous fuel solution supplied to the fuel cell as described, the amount of crossover during the power generation is increased, which enables to increase the amount of liquid discharged from the cathode and to increase the amount of liquid in the water reservoir. This is particularly effective when there is a shortage in the amount of liquid in the water reservoir due to the recycling operation of water from the water reservoir to the aqueous solution reservoir.

Further, preferably, detection frequency of the tilt of the fuel cell system is less while power generation is stopped than while power generation is underway. This makes it possible to reduce power consumption when the power generation is not underway.

Transportation equipment and electronic instruments that include a fuel cell system are sometimes tilted to or beyond a predetermined limit. Therefore, preferred embodiments of the present invention are suitable for transportation equipment and electronic instruments which include a fuel cell system.

The term "tilt time" refers to a period of time in which the fuel cell system is in a state of being tilted to or beyond a predetermined limit.

The term "recovery mode" refers to a start-up mode in which conditions in the fuel cell system which underwent a tilt not smaller than a predetermined limit are brought back to normal conditions before undergoing the tilt not smaller than the predetermined limit, or a start-up mode in which the system is started at a lower output than in the normal mode.

The term "normal mode" refers to a start-up mode used when the fuel cell system has not been tilted to or beyond the predetermined limit.

There may be other start-up modes than the recovery mode and the normal mode.

The above-described elements, steps, characteristics, aspects and advantages of the present invention will become clearer from the following detailed description of preferred embodiments with reference to the attached drawings.

BRIEF DESCRIPTION OF THE DRAWINGS

FIG. 12 shows table data relating tilt time to stand-by time.

FIG. 13 is a diagram for describing the tilt time, the stand-by time and normal time.

DETAILED DESCRIPTION OF PREFERRED EMBODIMENTS

Figure 1:
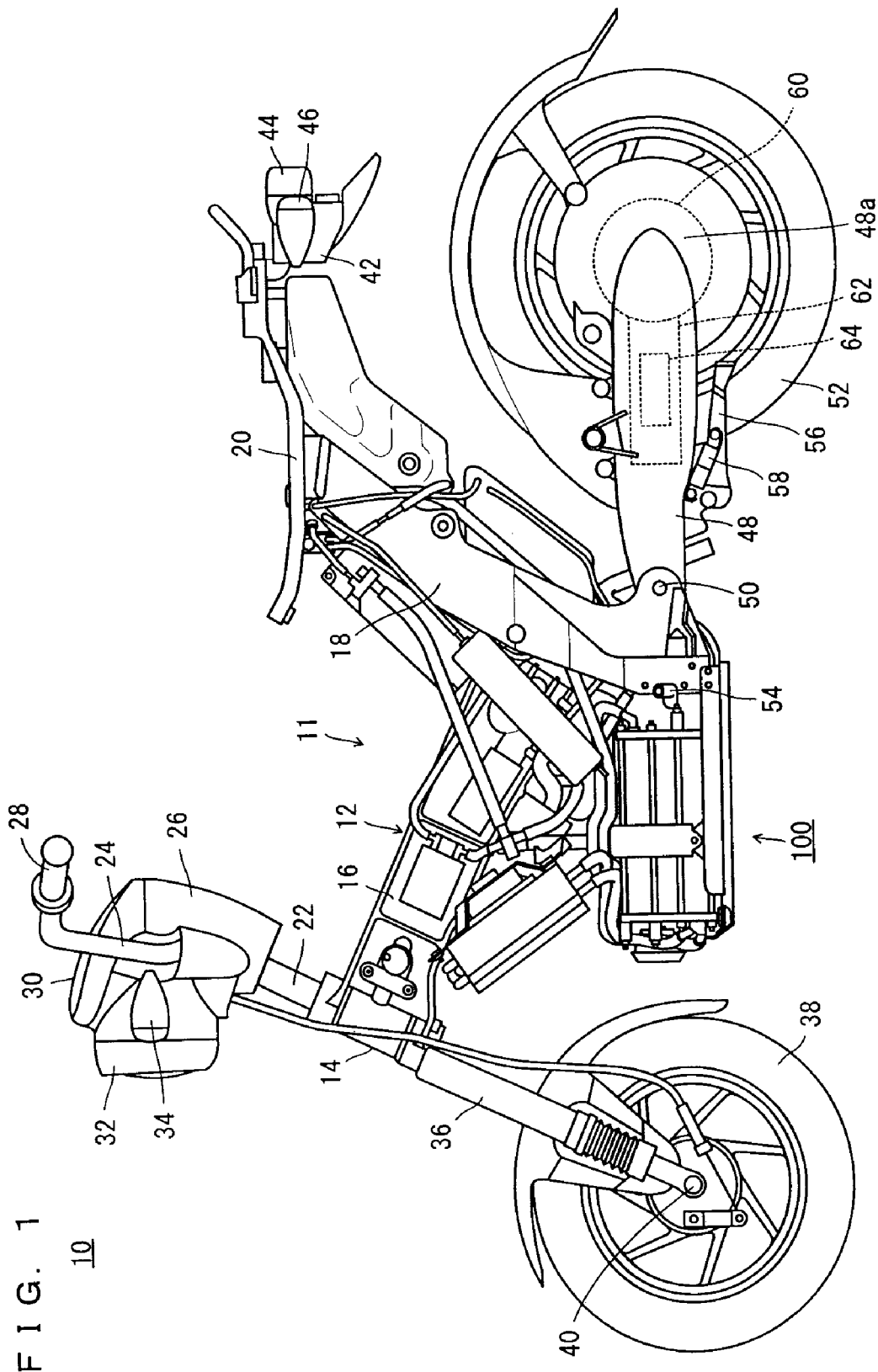
FIG. 1 is a left side view of a motorbike according to a preferred embodiment of the present invention.
Figure 2:
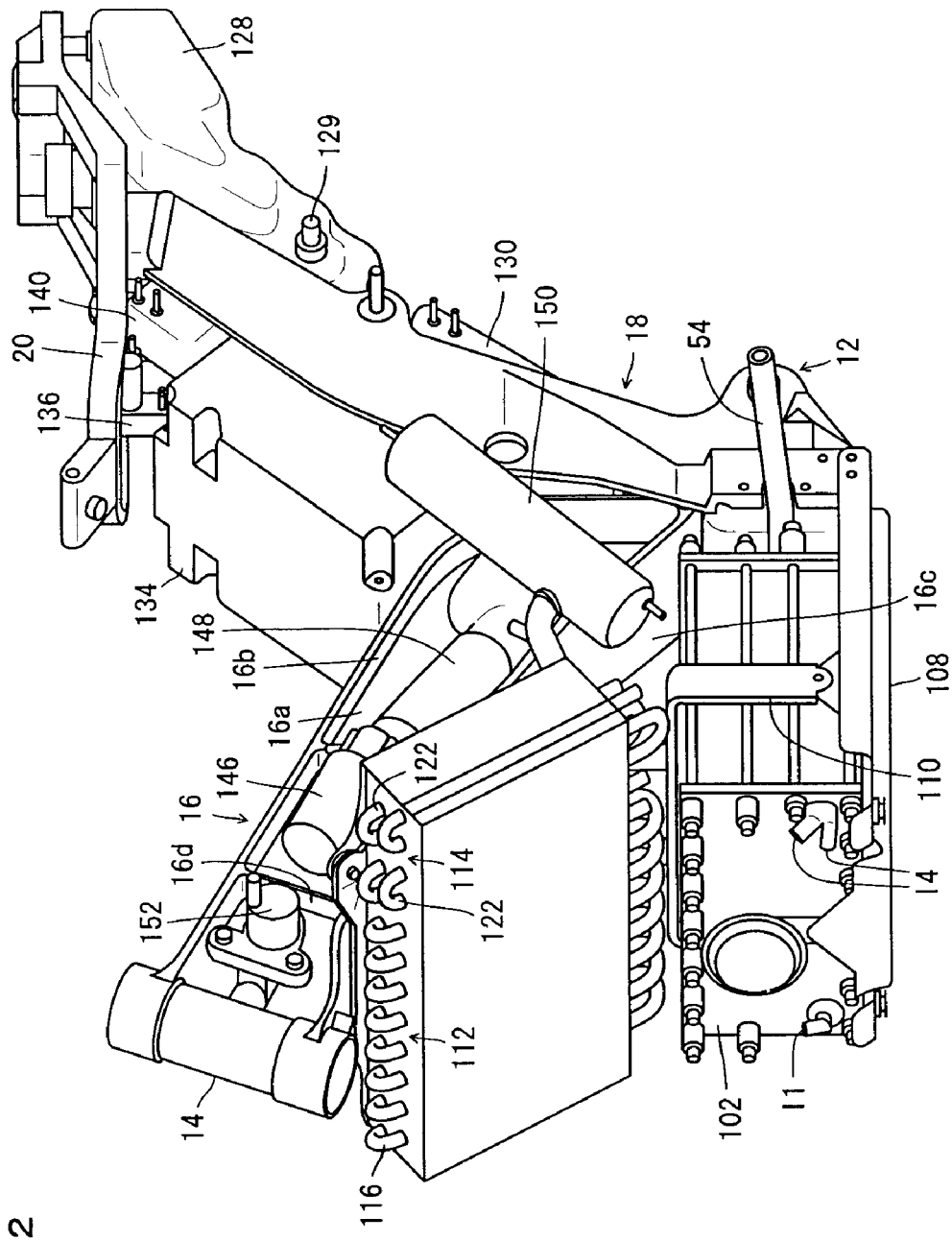
FIG. 2 is a perspective view taken from front left, showing how the fuel cell system is mounted on a motorbike frame.
Figure 3:
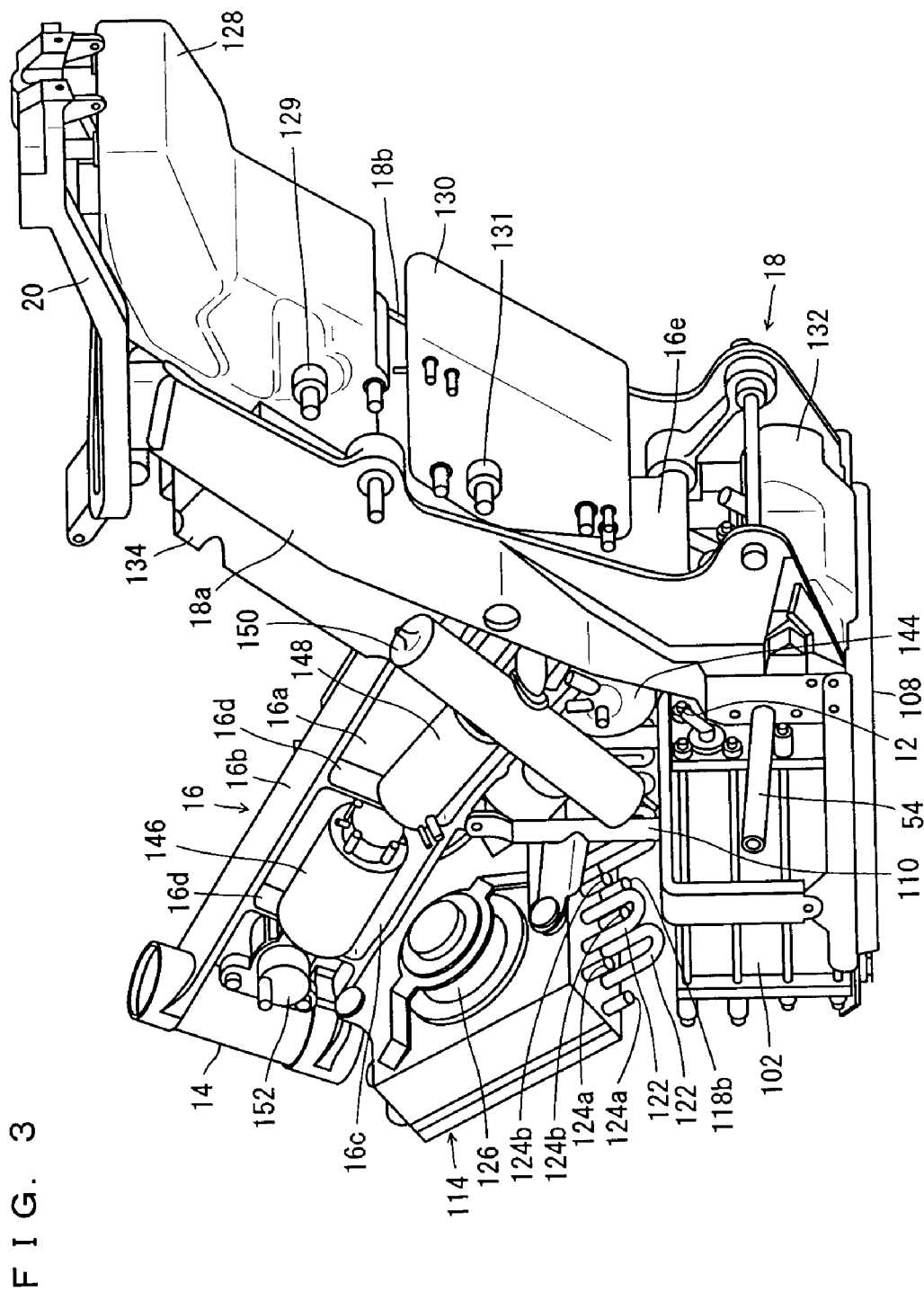
FIG. 3 is a perspective view taken from rear left, showing how the fuel cell system is mounted on the motorbike frame.

Hereinafter, preferred embodiments of the present invention will be described, with reference to the drawings. The preferred embodiments are cases in which a fuel cell system 100 according to the present invention is equipped in a motorbike 10 as an example of transportation equipment.

The description will first cover the motorbike 10. It is noted that the terms left and right, front and rear, up and down as used in the embodiments of the present invention are determined from the normal state of riding, i.e., as viewed by the rider sitting on the rider's seat of the motorbike 10, with the rider facing toward a handle 24.

Referring to FIG. 1 through FIG. 7, the motorbike 10 includes a vehicle body 11. The vehicle body 11 has a vehicle frame 12. The vehicle frame 12 includes a head pipe 14, a front frame 16 which has an I-shaped vertical section and extends in a rearward and downward direction from the head pipe 14, a rear frame 18 which is connected with a rear end of the front frame 16 and rising in a rearward and upward direction, and a seat rail 20 which is attached to a top end of the rear frame 18. The front frame 16 has its rear end connected with a location on the rear frame 18 that is close to but slightly away from a center portion of the rear frame 18 toward a lower end. The front frame 16 and the rear frame 18 combine to form a substantially Y-shaped structure as viewed from the side.

The front frame 16 preferably includes a plate member 16a which has a width in the vertical directions and extends in a rearward and downward direction, substantially perpendicularly to the lateral directions of the vehicle; flanges 16b, 16c which are disposed respectively at an upper end edge and a lower end edge of the plate member 16a, extend in a rearward and downward direction and have a width in the lateral directions; reinforcing ribs 16d protruding from both surfaces of the plate member 16a; and a connecting region 16e at a rear end for connecting the rear frame 18 with bolts, for example. The reinforcing ribs 16d and the flanges 16b, 16c define storage walls, providing compartments on both surfaces of the plate member 16a as storage spaces for components of a fuel cell system 100 to be described later.

The rear frame 18 preferably includes plate members 18a, 18b which extend in a rearward and upward direction, have a width extending in the front and rear directions, and sandwich the connecting region 16e of the front frame 16; and a plate member (not illustrated) which connects the plate members 18a and 18b.

As shown in FIG. 1, a steering shaft 22 is pivotably inserted in the head pipe 14 for steering the vehicle. A handle support 26 is provided at an upper end of the steering shaft 22, to which a handle 24 is fixed. Grips 28 are provided at both ends of the handle 24. The right-hand grip 28 serves as a rotatable throttle grip.

A display/operation board 30 is provided in front of the handle 24 of the handle support 26. The display/operation board 30 is an integrated dashboard including a meter 30a for measuring and displaying various data concerning an electric motor 60 (to be described later), a display portion 30b provided by, e.g. a liquid crystal display, for providing the rider with a variety of information concerning the riding conditions, and input portion 30c for inputting a variety of information. A head lamp 32 is provided below the display/operation board 30 at the handle support 26, and a flasher lamp 34 is provided on each of the left and right sides of the head lamp 32.

A pair of left and right front forks 36 extend downwardly from a bottom end of the steering shaft 22. Each of the front forks 36 includes a bottom end supporting a front wheel 38 via a front wheel shaft 40. The front wheel 38 is suspended by the front forks 36, and is freely rotatable around the front wheel shaft 40.

On the other hand, a frame-like seat rail 20 is attached to a rear end of the rear frame 18. The seat rail 20 is fixed on an upper end of the rear frame 18 by welding, for example, generally in the front and rear directions. An unillustrated seat is mounted pivotably on the seat rail 20. A mounting bracket 42 is fixed to a rear end of the seat rail 20. The mounting bracket 42 supports a tail lamp 44 and a pair of left and right flasher lamps 46.

The rear frame 18 includes a lower end that pivotably supports a swing arm (rear arm) 48 via a pivot shaft 50. The swing arm 48 has a rear end 48a that rotatably supports a driving wheel i.e., a rear wheel 52, on a shaft via an electric motor 60 (to be described later). The swing arm 48 and the rear wheel 52 are suspended with an unillustrated rear cushion with respect to the rear frame 18.

A pair of footrest attaching bars 54 are provided at a lower front portion of the rear frame 18, to protrude in the left and right directions from the rear frame 18, respectively. An unillustrated footrest is attached to each of the footrest attaching bars 54. Behind the footrest attaching bars 54, a main stand 56 is pivotably supported by the swing arm 48. The main stand 56 is biased in a closing direction by a return spring 58.

Figure 11:
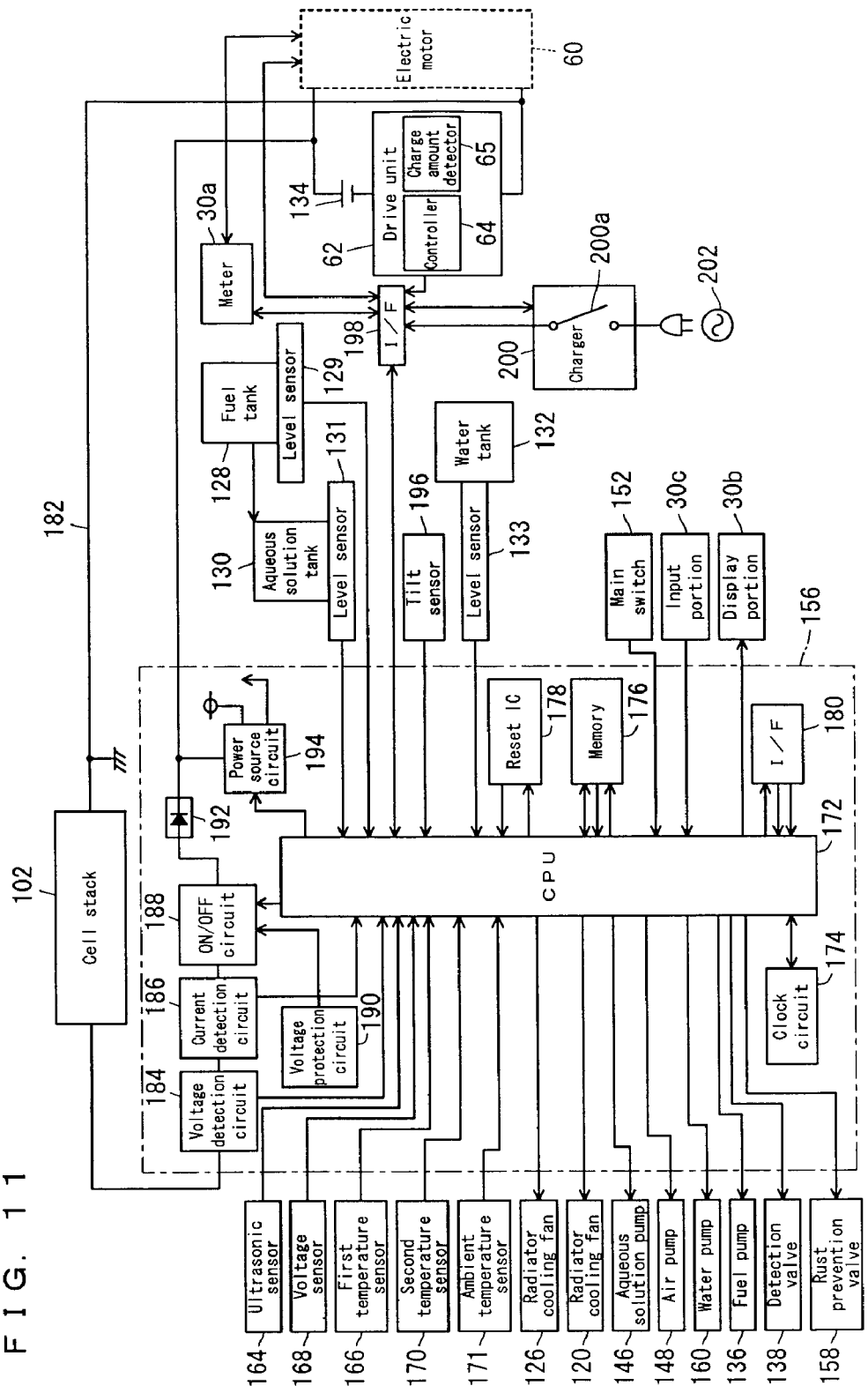
FIG. 11 is a block diagram showing an electrical configuration of the fuel cell system.
Figure 14:
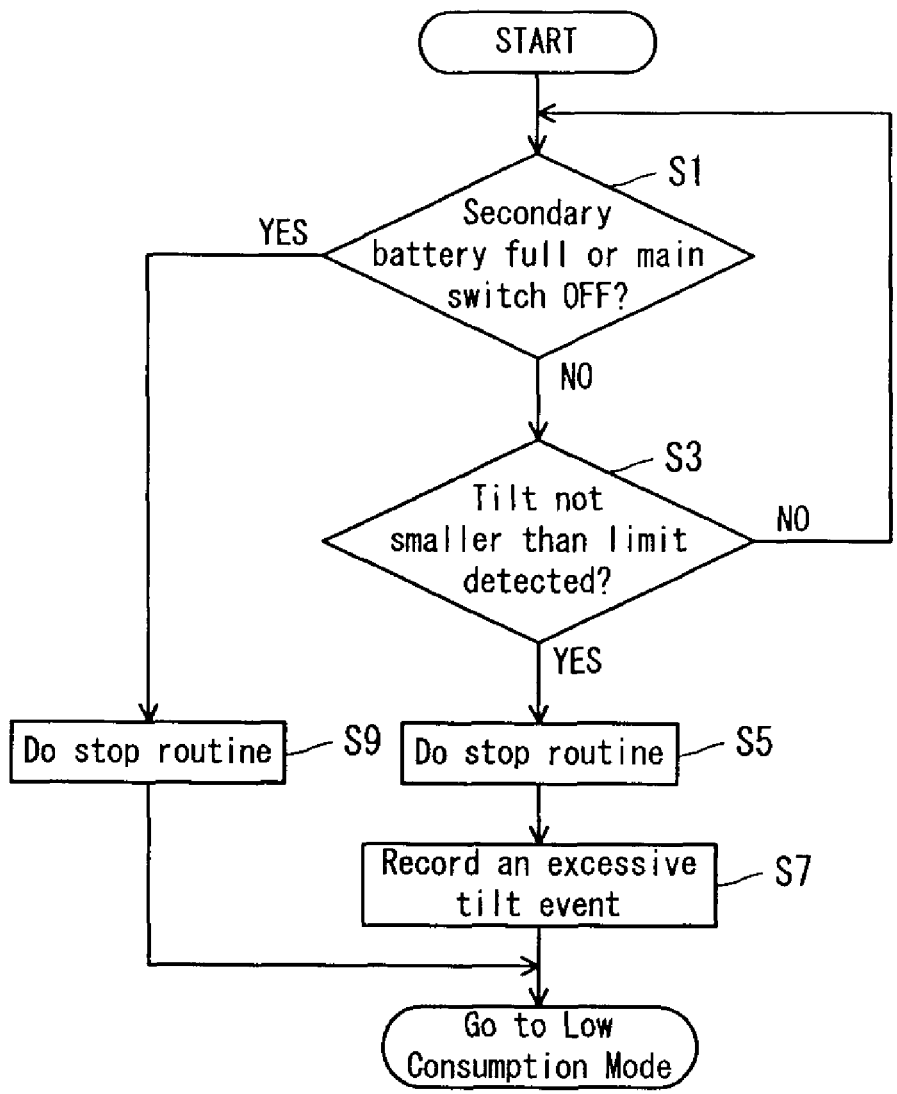
FIG. 14 is a flowchart showing an example of operation in a preferred embodiment of the present invention.

In the present preferred embodiment, the swing arm 48 is provided therein with an electric motor 60 of an axial gap type, for example, which is connected with the rear wheel 52 to rotate the rear wheel 52, and a drive unit 62 that is electrically connected with the electric motor 60. Referring also to FIG. 11, the drive unit 62 includes a controller 64 arranged to control the rotating drive of the electric motor 60, and a charge amount detector 65 for detecting the amount of charge in a secondary battery 134 (to be described later).

The vehicle body 11 of the motorbike 10 as described is equipped with a fuel cell system 100 along the vehicle frame 12. The fuel cell system 100 generates electric energy for driving the electric motor 60 and other components.

Hereinafter, the fuel cell system 100 will be described.

The fuel cell system 100 is a direct methanol fuel cell system that uses methanol (an aqueous solution of methanol) directly without reformation for power generation.

The fuel cell system 100 includes a fuel cell stack (hereinafter simply called cell stack) 102 mounted below the front frame 16.

Figure 8:
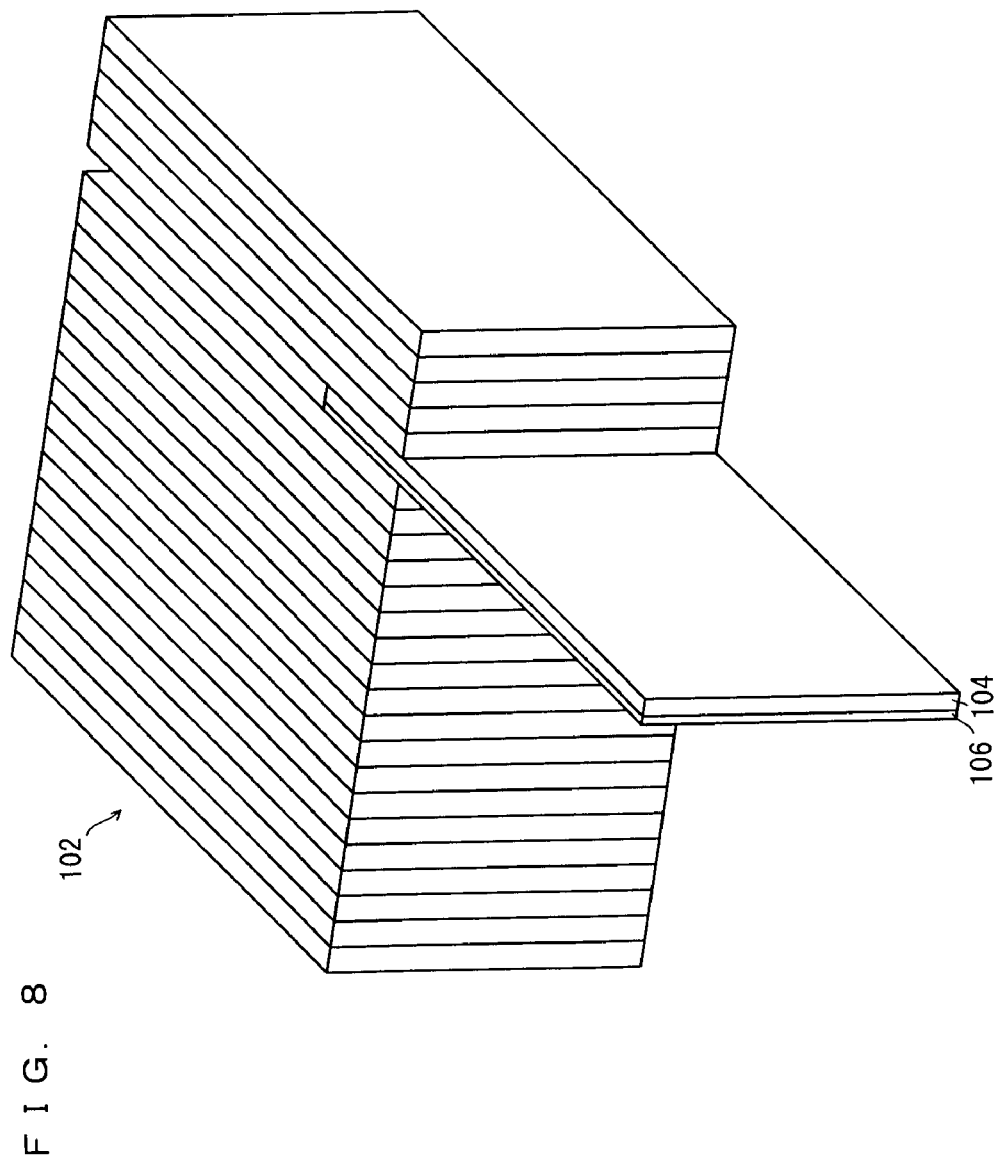
FIG. 8 is a diagram of a fuel cell stack.
Figure 9:
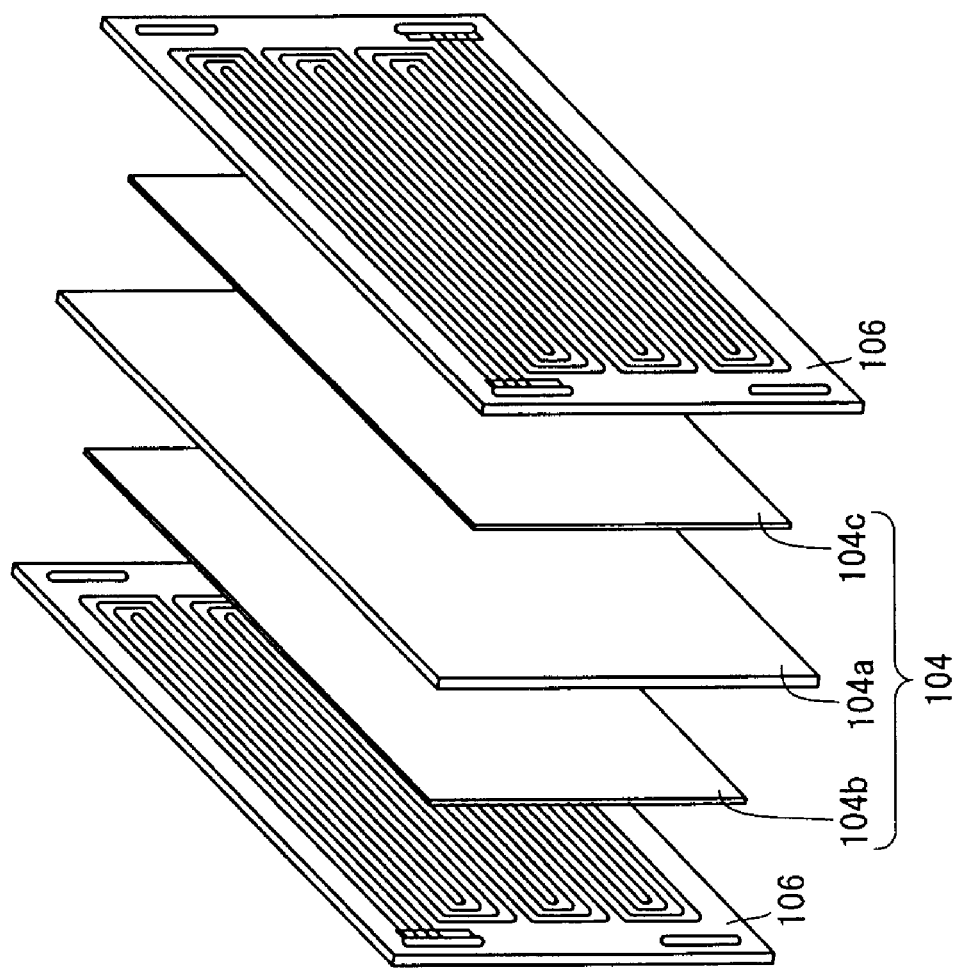
FIG. 9 is a diagram of an individual fuel cell.

As shown in FIG. 8 and FIG. 9, the cell stack 102 includes a plurality of fuel cells (individual fuel cells) 104 layered (stacked) in alternation with separators 106. Each fuel cell 104 is capable of generating electric energy through electrochemical reactions between hydrogen ions and oxygen based on methanol. Each fuel cell 104 in the cell stack 102 includes an electrolyte film 104a provided by a solid polymer film, for example, and a pair of an anode (fuel electrode) 104b and a cathode (air electrode) 104c opposed to each other, with the electrolyte film 104a in between. The anode 104b and the cathode 104c each preferably include a platinum catalyst layer provided on the side closer to the electrolyte film 104a.

Figure 4:
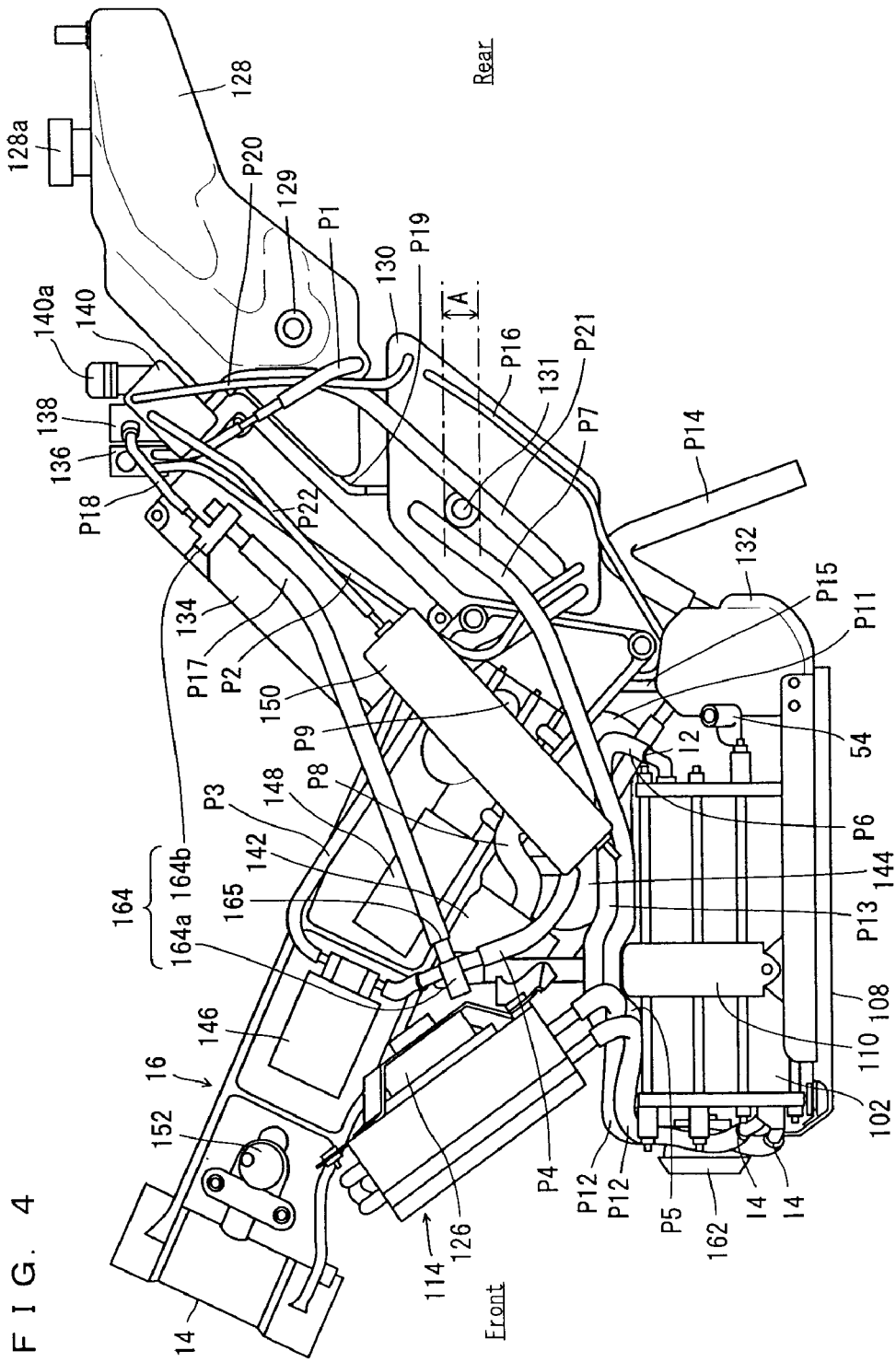
FIG. 4 is a left side view showing piping in the fuel cell system.

As shown in FIG. 4, etc., the cell stack 102 is placed on a skid 108. The skid 108 is supported by a stay stack 110 hung from the flange 16c of the front frame 16.

Figure 6:
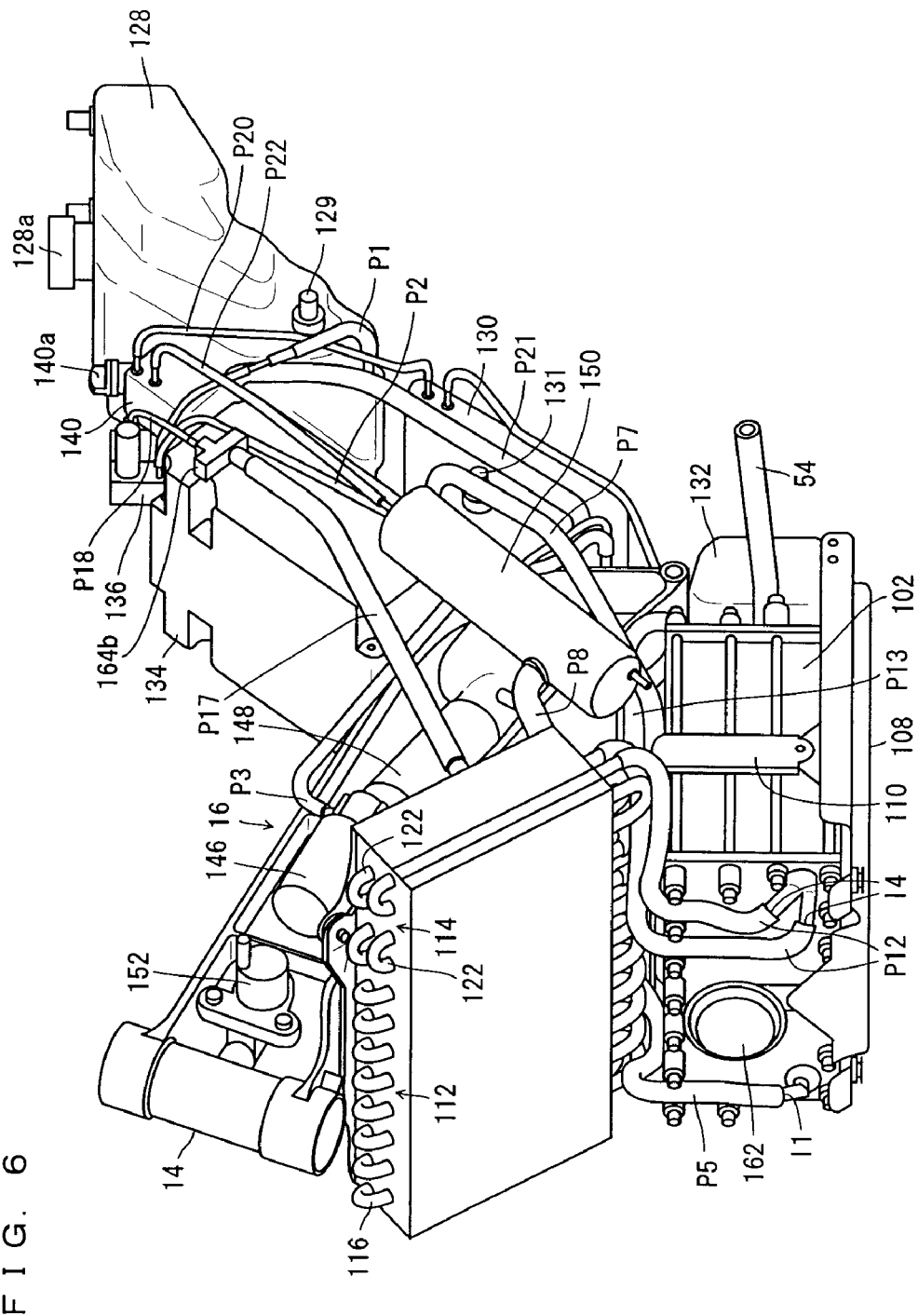
FIG. 6 is a perspective view taken from front left, showing the piping in the fuel cell system.
Figure 7:
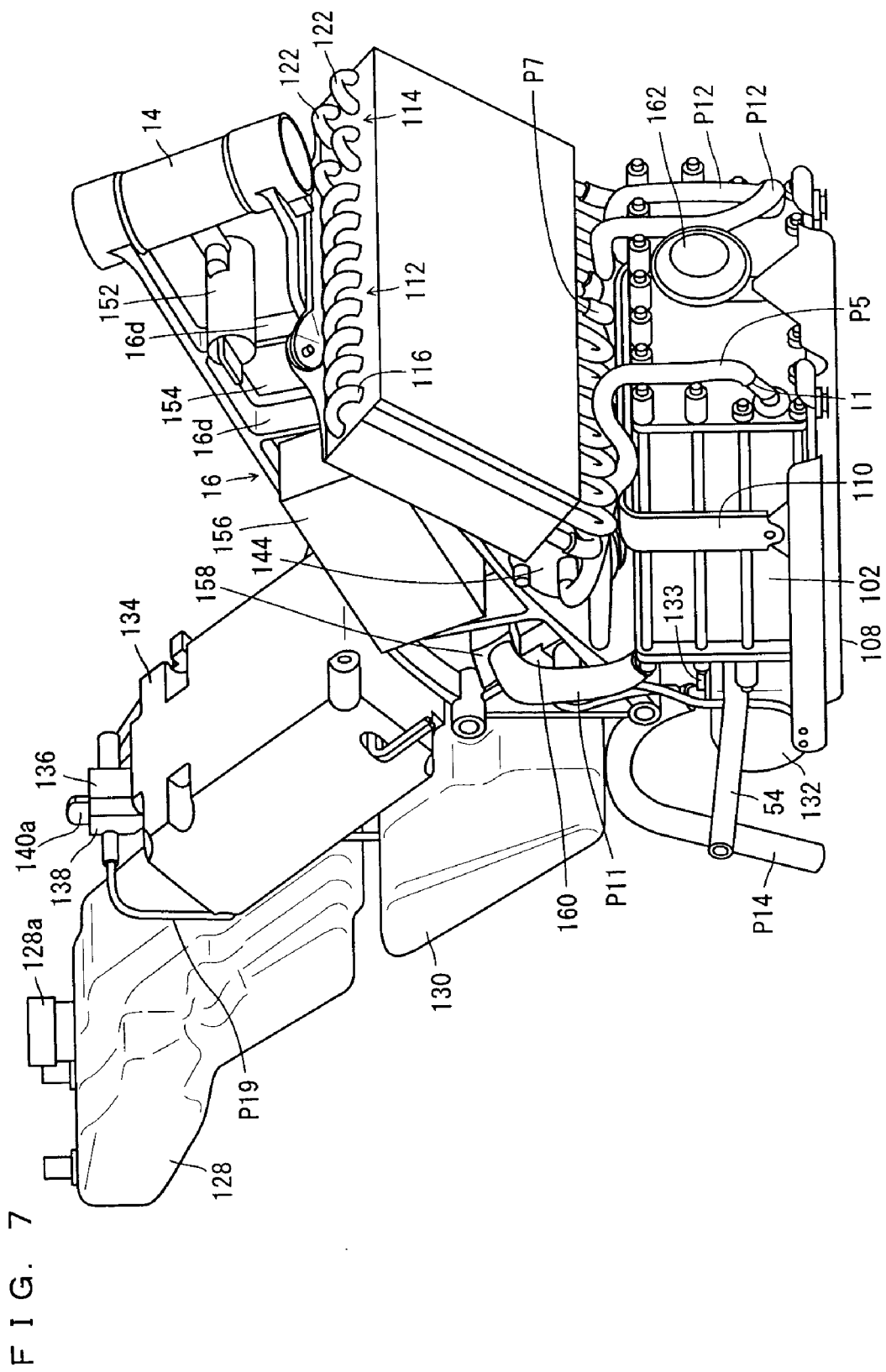
FIG. 7 is a perspective view taken from front right, showing the piping in the fuel cell system.

As shown in FIG. 6, an aqueous solution radiator 112 and a gas-liquid separation radiator 114 are disposed below the front frame 16, above the cell stack 102. The radiators 112 and 114 are integral with each other, having a front surface facing ahead of the vehicle in a slightly downward direction. The radiators 112 and 114 have a plurality of plate-like fins (not illustrated) that are substantially perpendicular to the front surface. The radiators 112 and 114 as described above can receive sufficient winds while the vehicle is running.

The radiator 112 includes a radiator pipe 116 arranged in a swirling pattern as shown in FIG. 6, etc. The radiator pipe 116 is preferably a single continuous pipe formed by welding a plurality of straight pipe members made of stainless steel, for example, with a plurality of generally U shaped pipe joints, extending from an inlet 118a (See FIG. 5) through an outlet 118b (See FIG. 3). The radiator 112 has a rear surface facing a cooling fan 120 opposed to the radiator pipe 116.

Likewise, the radiator 114 includes two radiator pipes 122 each arranged in a meandering pattern. Each radiator pipe 122 preferably is constituted by a single continuous pipe formed by welding a plurality of straight pipe members made of stainless steel, for example, with a plurality of generally U shaped pipe joints, extending from an inlet 124a (See FIG. 3) through an outlet 124b (See FIG. 3). The radiator 114 has a rear surface facing a cooling fan 126 opposed to the radiator pipe 122.

Returning to FIG. 1 through FIG. 7, and referring mainly to FIG. 3, a fuel tank 128, an aqueous solution tank 130 and a water tank 132 are disposed in this order from top to bottom, behind the connecting region 16e of the front frame 16. The fuel tank 128, the aqueous solution tank 130 and the water tank 132 are preferably formed by PE (polyethylene) blow molding, for example.

The fuel tank 128 is below the seat rail 20 and is attached to a rear end of the seat rail 20. The fuel tank 128 contains a methanol fuel (high concentration aqueous solution of methanol) having a high concentration level (containing methanol at approximately 50 wt %, for example), which is used as fuel for the electrochemical reaction in the cell stack 102. The fuel tank 128 has a lid 128a on its upper surface. The lid 128a is removed when replenishing the tank with methanol fuel.

The aqueous solution tank 130 is below the fuel tank 128, and is attached to the rear frame 18. The aqueous solution tank 130 contains aqueous methanol solution, which is a solution of the methanol fuel from the fuel tank 128 diluted to a suitable concentration (containing methanol at approximately 3 wt %, for example) for the electrochemical reaction in the cell stack 102. In other words, the aqueous solution tank 130 contains aqueous methanol solution that is to be sent by the aqueous solution pump 146 (to be described later) to the cell stack 102.

The fuel tank 128 is provided with a level sensor 129 for detecting the height of liquid surface of the methanol fuel in the fuel tank 128. The aqueous solution tank 130 is provided with a level sensor 131 for detecting the height of liquid surface of the aqueous methanol solution in the aqueous solution tank 130. By detecting the height of liquid surfaces with the level sensors 129, 131, the amount of liquids in the tanks can be detected. The liquid surface in the aqueous solution tank 130 is controlled to stay within a range indicated by a letter A in FIG. 4 for example.

The water tank 132 is disposed between the plate members 18a and 18b of the rear frame 18 and behind the cell stack 102. A level sensor 133 is attached to the water tank 132 in order to detect a water level in the water tank 132. By detecting the water level with the level sensor 133, the amount of water in the water tank 132 can be detected.

In front of the fuel tank 128 and above the flange 16b of the front frame 16 is a secondary battery 134. The secondary battery 134 is disposed on an upper surface of the plate member (not illustrated) of the rear frame 18. The secondary battery 134 stores the electric energy generated by the cell stack 102, and supplies the stored electric energy to the electric components in response to commands from the controller 156 (to be described later). For example, the secondary battery 134 supplies electric energy to peripheral components and the drive unit 62.

Above the secondary battery 134 and below the seat rail 20 is disposed a fuel pump 136 and a detection valve 138. Further, a catch tank 140 is disposed above the aqueous solution tank 130.

The catch tank 140 has a lid 140a on its upper surface. If the fuel cell system 100 has not ever been started (when the aqueous solution tank 130 is empty), for example, the lid 140a is removed to supply the tank with aqueous methanol solution. The catch tank 140 is preferably formed by PE (polyethylene) blow molding, for example.

An air filter 142 is disposed in a space surrounded by the front frame 16, the cell stack 102 and the radiators 112, 114 for removing impurities such as dust contained in gas. Behind and below the air filter 142 is disposed an aqueous solution filter 144.

As shown FIG. 4, an aqueous solution pump 146 and an air pump 148 are housed in the storage space on the left side of the front frame 16. On the left side of the air pump 148 is an air chamber 150. The aqueous solution pump 146 operates to pump aqueous methanol solution toward the cell stack 102.

Figure 5:
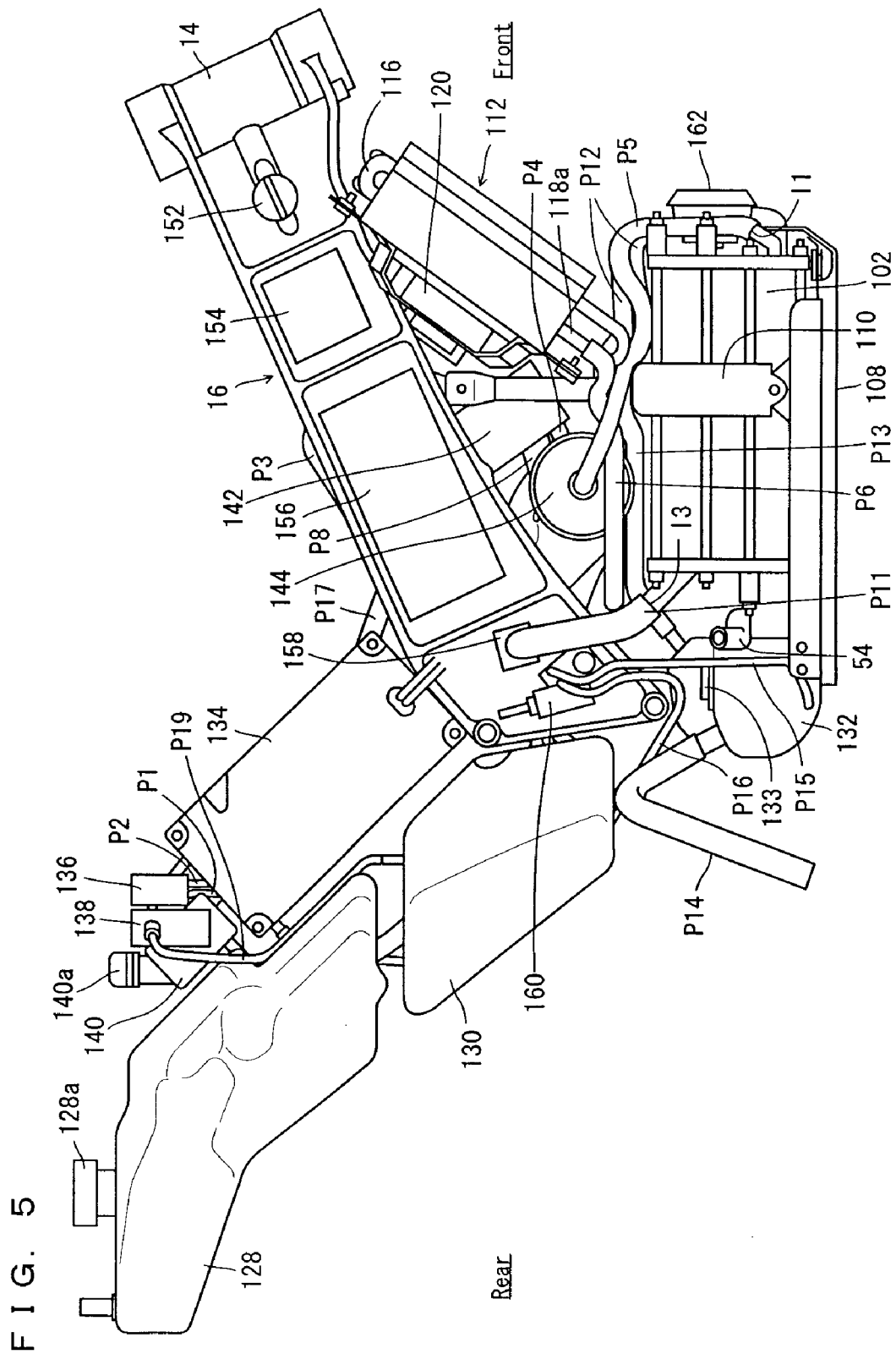
FIG. 5 is a right side view showing the piping in the fuel cell system.

Further, as shown in FIG. 5, a main switch 152, a DC-DC converter 154, a controller 156, a rust prevention valve 158 and a water pump 160 are disposed in this order from front to rear in the storage space on the right side of the front frame 16. The main switch 152 penetrates the storage space in the front frame 16 from right to left. In front of the cell stack 102 is a horn 162. The DC-DC converter 154 converts the electric voltage from 24 volts to 12 volts. The 12 volt power is used to drive fans 120, 126.

With the above-described layout, reference will now be made to FIG. 4 through FIG. 7 and FIG. 10 to describe piping in the fuel cell system 100.

The fuel tank 128 and the fuel pump 136 are connected with each other by a pipe P1. The fuel pump 136 and the aqueous solution tank 130 are connected with each other by a pipe P2. The pipe P1 connects a lower end of a left side surface of the fuel tank 128 with a lower end of a left side surface of the fuel pump 136. The pipe P2 connects a lower end of a left side surface of the fuel pump 136 with a lower end of a left side surface of the aqueous solution tank 130. By driving the fuel pump 136, methanol fuel in the fuel tank 128 is supplied to the aqueous solution tank 130 via the pipes P1, P2.

The aqueous solution tank 130 and the aqueous solution pump 146 are connected with each other by a pipe P3. The aqueous solution pump 146 and the aqueous solution filter 144 are connected with each other by a pipe P4. The aqueous solution filter 144 and the cell stack 102 are connected with each other by a pipe P5. The pipe P3 connects a lower corner of a left side surface of the aqueous solution tank 130 with a rear portion of the aqueous solution pump 146. The pipe P4 connects a rear portion of the aqueous solution pump 146 with a left side surface of the aqueous solution filter 144. The pipe P5 connects a right side surface of the aqueous solution filter 144 with an anode inlet I1 located at a right lower corner of a front surface of the cell stack 102. By driving the aqueous solution pump 146, aqueous methanol solution from the aqueous solution tank 130 is pumped from the pipe P3 side toward the pipe P4 side. Then, the aqueous solution filter 144 removes impurities from the aqueous methanol solution, and the solution flows through the pipe P5 to the cell stack 102. According to the present preferred embodiment, the pipes P4 and P5 constitute a guide pipe that guides aqueous methanol solution from the aqueous solution pump 146 to each of the fuel cells 104 in the cell stack 102.

The cell stack 102 and the aqueous solution radiator 112 are connected with each other by a pipe P6, and the radiator 112 and the aqueous solution tank 130 are connected with each other by a pipe P7. The pipe P6 connects an anode outlet I2 located at an upper left corner of a rear surface of the cell stack 102 with an inlet 118a (See FIG. 5) of the radiator pipe 116 that comes out of a right side end of a lower surface of the radiator 112. The pipe P7 connects an outlet 118b (See FIG. 3) of the radiator pipe 116 with an upper corner of a left side surface of the aqueous solution tank 130. The radiator pipe 116 comes out of a lower surface of the radiator 112, from near a left end but slightly closer to the center of the radiator's lower surface. Unused aqueous methanol solution and carbon dioxide discharged from the cell stack 102 flow through the pipe P6 to the radiator 112 where they are cooled, and then returned via the pipe P7 to the aqueous solution tank 130. With this arrangement, the temperature of aqueous methanol solution in the aqueous solution tank 130 can be deceased.

The pipes P1 through P7 serve primarily as a flow path for the fuel.

The air filter 142 and the air chamber 150 are connected with each other by a pipe P8. The air chamber 150 and the air pump 148 are connected with each other by a pipe P9, the air pump 148 and the rust prevention valve 158 are connected with each other by a pipe P10 whereas the rust prevention valve 158 and the fuel cell stack 102 are connected with each other by a pipe P11. The pipe P8 connects a rear portion of the air filter 142 with a portion of the air chamber 150 that is disposed slightly ahead of the center of the chamber. The pipe P9 connects a lower center portion of the air chamber 150 with a rear portion of the air pump 148. The pipe P10 connects the air pump 148 located on the left side of the plate member 16a in the front frame 16 with the rust prevention valve 158 located on the right side of the plate member 16a. The pipe P11 connects the rust prevention valve 158 with a cathode inlet I3 located on an upper right end of a rear surface of the cell stack 102. When the fuel cell system 100 generates power, the rust prevention valve 158 is opened. By driving the air pump 148 under this condition, air containing oxygen is introduced from outside. The introduced air is purified by the air filter 142, then flows through the pipe P8, the air chamber 150 and the pipe P9 to the air pump 148, and then through the pipe P10, the rust prevention valve 158 and the pipe P11, and is supplied to the cell stack 102. The rust prevention valve 158 is closed when the fuel cell system 100 is stopped, prevents backflow of water vapor into the air pump 148 and thereby prevents rusting of the air pump 148.

The cell stack 102 and the gas-liquid separation radiator 114 are connected with each other by two pipes P12. The radiator 114 and the water tank 132 are connected with each other by two pipes P13. The water tank 132 is provided with a pipe (exhaust pipe) P14. Each of the pipes P12 connects a cathode outlet I4 located on a lower left corner of a front surface of the cell stack 102 with an inlet 124a (See FIG. 3) of a corresponding radiator pipe 122 which comes out from a left side end of a lower surface of the radiator 114. Each of the pipes P13 connects an outlet 124b (See FIG. 3) of a corresponding one of the radiator pipes 122 with an upper portion of a front surface of the water tank 132. The radiator pipes 122 come out of the lower surface of the radiator 114, at a location slightly closer to the center than the left side end. The pipe P14 is connected with an upper portion of a rear surface of the water tank 132, and is angled so it goes up and then down. Exhaust gas, which is discharged from the cathode outlet I4 of the cell stack 102, contains water (liquid water and water vapor) and carbon dioxide. The exhaust gas flows through the pipe P12 into the radiator 114, where water vapor is liquefied. After leaving the radiator 114, the exhaust gas flows together with the water through the pipe P13 into the water tank 132, before being discharged to the outside via the pipe P14.

The pipes P8 through P14 serve primarily as a flow path for the exhaust gas.

The water tank 132 and the water pump 160 are connected with each other by a pipe P15, whereas the water pump 160 and the aqueous solution tank 130 are connected with each other by a pipe P16. The pipe P15 connects a lower portion of a right side surface of the water tank 132 with a center portion of the water pump 160. The pipe P16 connects a center portion of the water pump 160 with an upper corner of a left side surface of the aqueous solution tank 130. By driving the water pump 160, water in the water tank 132 is returned to the aqueous solution tank 130 via the pipes P15, P16.

The pipes P15, P16 serve as a flow path for the water.

The pipe P4 is connected with the pipe P17 so as to receive part of aqueous methanol solution that is pumped by the aqueous solution pump 146 and is flowing through the pipe P4. As shown in FIG. 4, an ultrasonic sensor 164 is attached to the pipe P17 for measuring methanol concentration in the aqueous methanol solution in the pipe P17. The ultrasonic sensor 164 is used for measuring the methanol concentration of the aqueous methanol solution in the pipe P17, based on the principle that the ultrasonic wave travels at different speeds depending on the methanol concentration of aqueous methanol solution (methanol percentage in the aqueous methanol solution) which is flowing in the pipe.

As shown in FIG. 4, the ultrasonic sensor 164 has a transmitter unit 164a that transmits an ultrasonic wave, and a receiver unit 164b that detects the ultrasonic wave. The transmitter unit 164a is inserted into the pipe P4. The transmitter unit 164a has a prong 165 that is connected with a starting end of the pipe P17. Through the prong 165, methanol aqueous solution is introduced into the pipe P17. The receiver unit 164b is connected with a tail end of the pipe P17, and is disposed on the left side surface of the secondary battery 134. The ultrasonic sensor 164 generates an ultrasonic wave at the transmitter unit 164a, receives the ultrasonic wave at the receiver unit 164b, detects an ultrasonic wave propagation speed based on the amount of time from the start of ultrasonic wave generation at the transmitter unit 164a to the reception of the ultrasonic wave at the receiver unit 164b, and converts the propagation speed into a voltage value which represents physical concentration information. Based on this concentration information, the controller 156 detects a methanol concentration of the aqueous methanol solution in the pipe P17.

The receiver unit 164b and the detection valve 138 are connected with each other by a pipe P18. The detection valve 138 and the aqueous solution tank 130 are connected with each other by a pipe P19. The pipe P18 connects an upper surface of the receiver unit 164b with a left side surface of the detection valve 138. The pipe P19 connects a right side surface of the detection valve 138 with an upper surface of the aqueous solution tank 130.

The pipes P17 through P19 serve as a flow path primarily for concentration detection.

The aqueous solution tank 130 and the catch tank 140 are connected with each other by a pipe P20. The catch tank 140 and the aqueous solution tank 130 are connected with each other by a pipe P21. The catch tank 140 and the air chamber 150 are connected with each other by a pipe P22. The pipe P20 connects an upper corner of a left side surface of the aqueous solution tank 130 with an upper corner of a left side surface of the catch tank 140. The pipe P21 connects a lower end of the catch tank 140 with a lower corner of a left side surface of the aqueous solution tank 130. The pipe P22 connects a location of a left side surface of the catch tank 140 closer to an upper portion thereof, with an upper end surface of the air chamber 150. Gas (main ingredients are carbon dioxide, gaseous methanol and water vapor) in the aqueous solution tank 130 is supplied to the catch tank 140 via the pipe P20. The gaseous methanol and the water vapor are cooled and liquefied in the catch tank 140, then flow through the pipe P21 back to the aqueous solution tank 130. Gas (carbon dioxide, methanol which was not liquefied and water vapor) in the catch tank 140 is supplied to the air chamber 150 via the pipe P22.

The pipes P20 through P22 constitute a flow path primarily for fuel processing.

Figure 10:
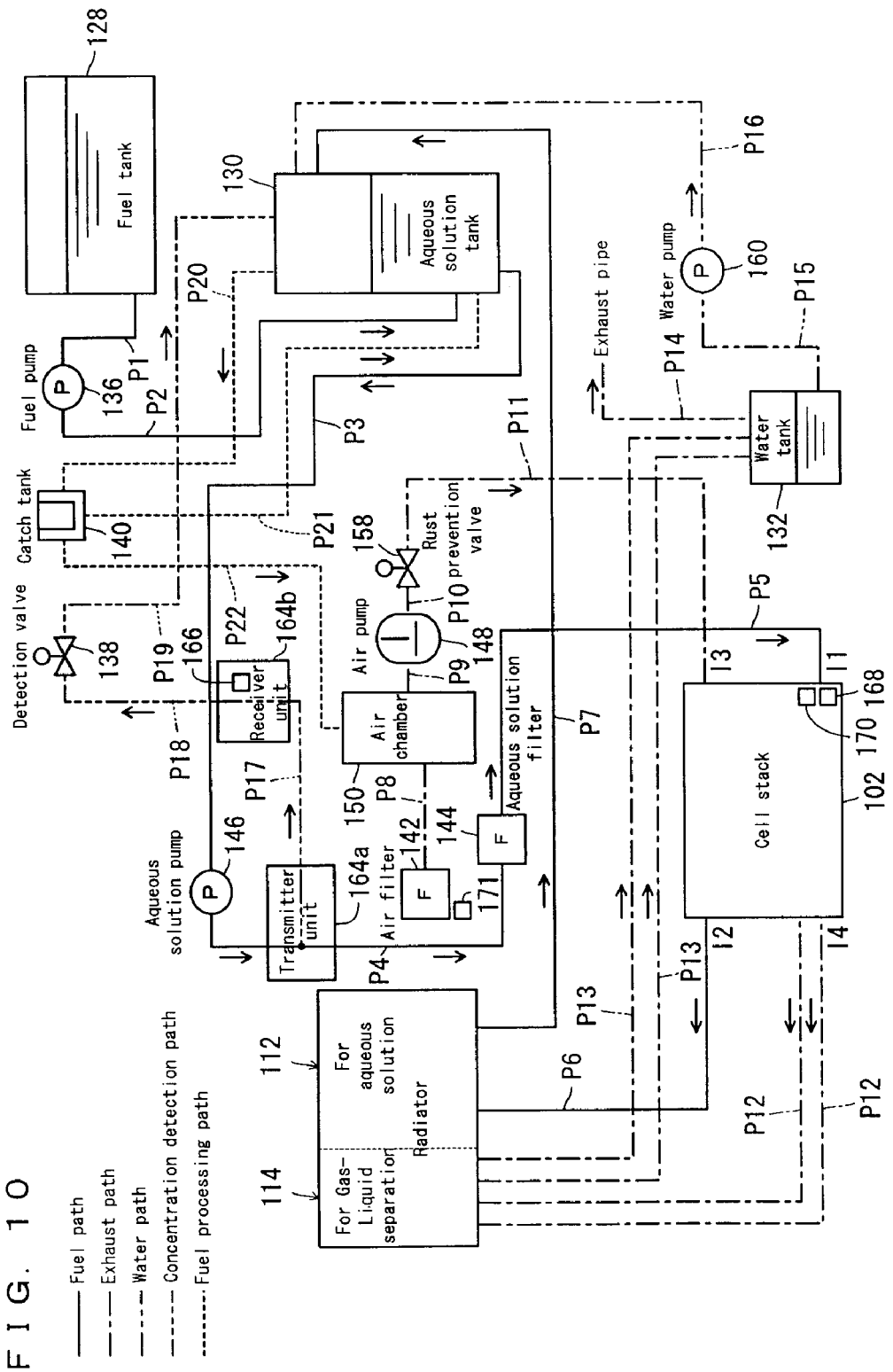
FIG. 10 is a system diagram showing piping of the fuel cell system.

As shown in FIG. 10, the receiver unit 164b of the ultrasonic sensor 164 is provided with a first temperature sensor 166 for detecting the temperature of aqueous methanol solution that is flowing through the ultrasonic sensor 164. Near an anode inlet I1 of the cell stack 102, there are provided a voltage sensor 168 for detecting concentration information which represents the concentration of aqueous methanol solution supplied to the cell stack 102 by using electrochemical characteristics of the aqueous methanol solution, and a second temperature sensor 170 for detecting the temperature of the aqueous methanol solution supplied to the cell stack 102. Further, an ambient temperature sensor 171 for detecting the ambient temperature is provided near an air filter 142. The voltage sensor 168 detects an open circuit voltage of the fuel cell (individual fuel cell) 104, which represents the electrochemical concentration information.

Description will now cover an electrical configuration of the fuel cell system 100 while making reference to FIG. 11.

The controller 156 of the fuel cell system 100 preferably includes a CPU 172 arranged to perform necessary calculations and controlling operations of the fuel cell system 100; a clock circuit 174 which provides the CPU 172 with clock signals; a memory 176 preferably including, e.g., an EEPROM for storing programs and data for controlling the operations of the fuel cell system 100 as well as calculation data, etc.; a reset IC 178 arranged to prevent erroneous operation of the fuel cell system 100; an interface circuit 180 for connection with external components; a voltage detection circuit 184 arranged to detect a voltage in an electric circuit 182 which connects the cell stack 102 with the electric motor 60 that drives the motorbike 10; a current detection circuit 186 arranged to detect an electric current which passes through the fuel cell 104 i.e. the cell stack 102; an ON/OFF circuit 188 arranged to open and close the electric circuit 182; a voltage protection circuit 190 arranged to protect the electric circuit 182 from overvoltage; a diode 192 placed in the electric circuit 182; and a power source circuit 194 arranged to provide the electric circuit 182 with a predetermined voltage.

The CPU 172 of the controller 156 as described above is supplied with detection signals from the ultrasonic sensor 164, the voltage sensor 168, the first temperature sensor 166, the second temperature sensor 170 and the ambient temperature sensor 171, a detected voltage value from the voltage detection circuit 184 and a detected current value from the current detection circuit 186. The CPU 172 is also supplied with detection signals from a tilt sensor 196 which detects the amount of tilt of the fuel cell system 100, input signals from a main switch 152 which turns ON or OFF the electric power, and other signals from the input portion 30c for various settings and information entry. Further, the CPU 172 is supplied with detection signals from the level sensors 129, 131 and 133.

The memory 176 stores programs for performing operations depicted in FIG. 14 through FIG. 19 as well as calculation data, etc.; conversion information for converting physical concentration information (a voltage which indicates an ultrasonic propagation speed) of the aqueous methanol solution obtained by the ultrasonic sensor 164 into a concentration; and conversion information for converting electrochemical concentration information (the open circuit voltage of the fuel cell 104) of the aqueous methanol solution obtained by the voltage sensor 168 into a concentration. The conversion information may be table data relating sensor output information to corresponding concentrations. Further, the memory 176 stores tilt information, a first predetermined value, a second predetermined value and a third predetermined value. The tilt information includes time-point data indicating when the system checked if there was a tilt not smaller than a predetermined limit, and result data indicating results of the checks. The result datum is "1" if there was a tilt not smaller than the predetermined limit or "0" if there was not.

The memory 176 also stores conversion information for converting the tilt time into a stand-by time. Specifically, table data in FIG. 12, which relates the tilt time to the stand-by time, is stored.

Referring to FIG. 13, it is noted here that the recovery mode allows the fuel cell 104 to be started once the normal time after the tilt of the fuel cell system 100 was no longer not smaller than the predetermined limit has reached the stand-by time obtained on the basis of the tilt time.

The CPU 172 controls system components such as the fuel pump 136, the aqueous solution pump 146, the air pump 148, the water pump 160, the cooling fans 120 and 126, the detection valve 138 and the rust prevention valve 158. The CPU 172 also controls the display portion 30b that displays various information for the motorbike rider.

The cell stack 102 is connected with the secondary battery 134 and the drive unit 62. The secondary battery 134 and the drive unit 62 are connected with the electric motor 60. The secondary battery 134 complements the output from the cell stack 102, by being charged with electric energy from the cell stack 102 and discharging the electric energy to supply power to the electric motor 60 and the system components.

The electric motor 60 is connected with the meter 30a for measuring various data concerning the electric motor 60. The data and status information of the electric motor 60 obtained by the meter 30a are supplied to the CPU 172 via the interface circuit 198.

In addition, a charger 200 is connectable with the interface circuit 198. The charger 200 is connectable with an external power source (commercial power source) 202. When the interface circuit 198 is connected with the external power source 202 via the charger 200, i.e. when the fuel cell system 100 is connected with the external power source 202, an external power source connection signal is sent via the interface circuit 198 to the CPU 172. The charger 200 has a switch 200a that can be turned ON/OFF by the CPU 172.

In the present preferred embodiment, the memory 176 defines a storage device, the CPU 172 defines the controller, the CPU 172 and the memory 176 define the time detector, the water tank 132 defines as the water reservoir, and the aqueous solution tank 130 defines as the aqueous solution reservoir.

The main switch 152 defines as the instruction unit. Further, the tilt detector preferably includes the tilt sensor 196, the air supply preferably includes the air pump 148, the water supply preferably includes the water pump 160, the aqueous solution amount detector preferably includes the level sensor 131, and the liquid amount detector preferably includes the level sensor 133. It should be noted that the elements of the present invention described in the present paragraph preferably include the components described herein, but could be constituted by other suitable components, as desired, and are not limited to the example of the preferred embodiments of the present invention.

Next, a main process of the fuel cell system 100 in operation (power generation) will be described.

When the main switch 152 is turned ON, the fuel cell system 100 drives its components such as the aqueous solution pump 146 and the air pump 148, thereby starting the operation.

As the aqueous solution pump 146 is driven, aqueous methanol solution stored in the aqueous solution tank 130 is sent from the pipe P3 side to the pipe P4 side, into the aqueous solution filter 144. The aqueous solution filter 144 removes impurities and so on from the aqueous methanol solution, then the aqueous methanol solution is sent through the pipe P5 and the anode inlet I1, and then supplied directly to the anode 104b in each of the fuel cells 104 which constitute the cell stack 102.

Meanwhile, as the air pump 148 is driven, air is introduced through the air filter 142 and flows through the pipe P8 into the air chamber 150 where noise is silenced. The air that was introduced and gas that was supplied to the air chamber 150 from the catch tank 140 are supplied via the pipes P9 through P11 and the cathode inlet I3 to the cathode 104c in each of the fuel cells 104 which constitute the cell stack 102.

At the anode 104b in each fuel cell 104, methanol and water in the supplied aqueous methanol solution chemically react with each other to produce carbon dioxide and hydrogen ions. The produced hydrogen ions flow to the cathode 104c via the electrolyte film 104a, and electrochemically react with oxygen in the air supplied to the cathode 104c, to produce water (water vapor) and electric energy. Thus, power generation is performed in the cell stack 102. The generated electric energy is sent to and stored at the secondary battery 134, and is used, for example, to drive the motorbike 10.

Carbon dioxide produced at the anode 104b in each fuel cell 104 and unused aqueous methanol solution are heated (up to approximately 65° C.-70° C. for example) in the electrochemical reaction, and part of the unused aqueous methanol solution is vaporized. The carbon dioxide and the unused aqueous methanol solution flow from the anode outlet I2 of the cell stack 102 into the aqueous solution radiator 112, where they are cooled (down to approximately 40° C. for example) by the fan 120 while flowing through the radiator pipe 116. The carbon dioxide and the unused aqueous methanol solution which have been cooled then flow through the pipe P7, and return to the aqueous solution tank 130.

Meanwhile, most of the water vapor occurred on the cathode 104c in each fuel cell 104 is liquefied and discharged in the form of water from the cathode outlet I4 of the cell stack 102, with saturated water vapor being discharged in the form of gas. Part of the water vapor that was discharged from the cathode outlet I4 is cooled in the radiator 114 and liquefied as its temperature decreases to or below the dew point. The radiator 114 liquefies the water vapor through operation of the fan 126. Water (liquid water and water vapor) from the cathode outlet I4 is supplied via the pipe P12, the radiator 114 and the pipe P13 to the water tank 132 together with unused air.

Also, at the cathode 104c in each fuel cell 104, the vaporized methanol from the catch tank 140 and methanol which has moved to the cathode due to crossover react with oxygen in the platinum catalyst layer, thereby being decomposed to harmless substances of water and carbon dioxide. The water and carbon dioxide produced from the methanol are discharged from the cathode outlet I4, and supplied to the water tank 132 via the radiator 114. Further, water that has moved due to water crossover to the cathode 104c in each fuel cell 104 is discharged from the cathode outlet I4, and supplied to the water tank 132 via the radiator 114.

The water collected in the water tank 132 is recycled appropriately by the pumping operation of the water pump 160, through the pipes P15, P16 to the aqueous solution tank 130, and is used as water for the aqueous methanol solution.

While the fuel cell system 100 is in operation, a concentration detection routine for aqueous methanol solution is performed regularly for efficient power generation by each fuel cell 104 while preventing the fuel cell 104 from premature deterioration. Based on the detection result, adjustment is made on the methanol concentration of aqueous methanol solution in the aqueous solution tank 130, which is to be supplied to the cell stack 102, to 3 wt. % approx. for example. Specifically, the controller 156 controls the fuel pump 136 and the water pump 160, whereby methanol fuel is supplied from the fuel tank 128 to the aqueous solution tank 130 whereas water is returned from the water tank 132 to the aqueous solution tank 130 based on the detection result of the methanol concentration.

Description will now cover how the fuel cell system 100 being operated as described above is stopped, with reference to FIG. 14.

First, while the fuel cell system 100 is in operation, the system checks if the secondary battery 134 is fully charged or the main switch 152 in the motorbike 10 is turned OFF (Step S1). If the secondary battery 134 is not fully charged and the main switch 152 of the motorbike 10 is not turned OFF, the system then checks if a tilt not smaller than a predetermined limit is detected (Step S3). If the tilt sensor 196 successively detects a situation for a predetermined amount of time in which the fuel cell system 100, i.e. the vehicle body 11, is tilted beyond a threshold, the CPU 172 determines that there is a state of tilt not smaller than a predetermined limit.

The threshold may be a maximum tilt angle of the vehicle body 11 since the vehicle body 11 of the motorbike 10 during operation and moving is sometimes tilted greatly. The maximum tilt angle refers to a tilt angle beyond which the vehicle can no longer be tilted while moving. Specifically, it may mean an angle at which there is a first contact between the ground and a vehicle member such as a footrest when the vehicle body 11 is tilted. When such a threshold is used, a rollover of the motorbike 10 will cause the tilt to exceed the threshold.

If Step S3 finds that there was a tilt not smaller than the predetermined limit, power generation in the fuel cell 104, i.e., in the cell stack 102 is stopped (Step S5). The stopping procedure includes stopping of system components such as the air pump 148 and the aqueous solution pump 146. Then, the event that there was a tilt not smaller than a predetermined limit is recorded (Step S7). Specifically, tilt information is stored in the memory 176 which includes a time-point datum that indicates the time when the system checked if there was a tilt not smaller than the predetermined limit and a result datum or the value "1" that indicates there was a tilt not smaller than the predetermined limit. Then, the system enters a low consumption mode. On the other hand, if Step S1 finds that the secondary battery 134 is fully charged or the main switch 152 of the motorbike 10 is turned OFF, power generation in the fuel cell 104, i.e., in the cell stack 102 is stopped (Step S9), and the system enters the low consumption mode.

Figure 15:
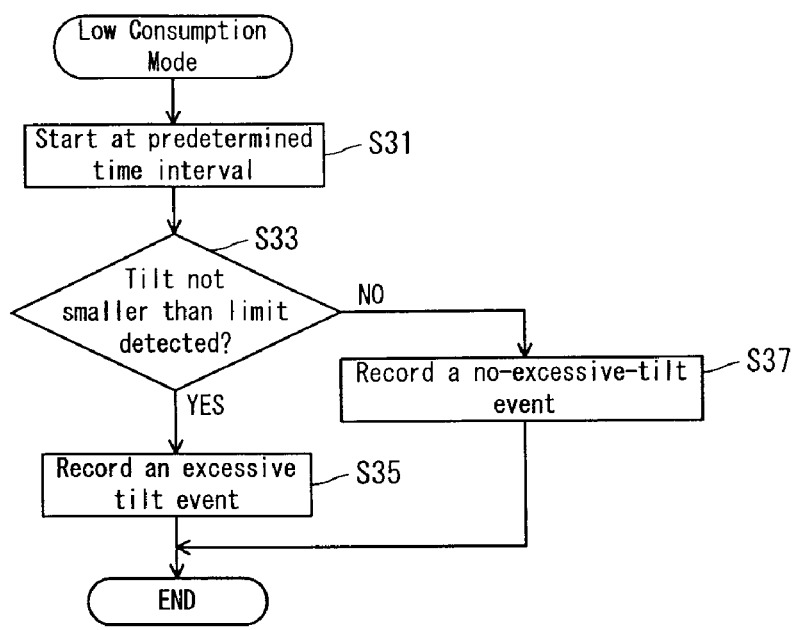
FIG. 15 is a flowchart showing an example of low consumption mode operation in a preferred embodiment of the present invention.

Next, description will cover an operation in the low consumption mode with reference to FIG. 15.

The operation in the low consumption mode is performed at a predetermined time interval (once a minute in the present embodiment) (Step S31), in which output from the tilt sensor 196 is checked to see if there is a tilt not smaller than the predetermined limit (Step S33). However, the tilt detection in Step S33 is made less frequently than in Step S3.

If a tilt not smaller than the predetermined limit is detected, the event that there was a tilt not smaller than the predetermined limit is recorded in the memory 176 (Step S35). Specifically, tilt information is stored in the memory 176 which includes a time-point data that indicates the time when the system checked if there was a tilt not smaller than the predetermined limit and a result data "1" that indicates there was a tilt not smaller than the predetermined limit, and the process comes to an end. On the other hand, if Step S33 does not find a tilt which is not smaller than the predetermined limit, the event that there was no tilt which was not smaller than the predetermined limit is recorded in the memory 176 (Step S37). Specifically, tilt information is stored in the memory 176 which includes a time-point datum that indicates the time when the system checked if there was a tilt not smaller than the predetermined limit and a result datum "0" that indicates there was no tilt which was not smaller than the predetermined limit, and the routine comes to an end.

Based on the tilt information as the above, it becomes possible to detect a tilt time and to select an optimum start-up mode. In the present preferred embodiment, it is possible to detect a continuous state of tilt not smaller than a predetermined limit by the minute, and to detect the tilt time by the minute.

Next, description will be made for the check mode for selecting a start-up mode, with reference to FIG. 16.

First, the system checks if the main switch 152 is turned ON (Step S51).

The system waits until the main switch 152 is turned ON. Once the main switch 152 is turned ON, the CPU 172 checks if there is a record of a tilt not smaller than the predetermined limit based on the result data in the tilt information stored in the memory 176 (Step S53). If there is a record of a tilt not smaller than the predetermined limit, the CPU 172 obtains the tilt time based on the tilt information in the memory 176 (Step S55). In the present preferred embodiment, the routine in the low consumption mode is performed at a time interval of one minute, so tilt information is added to the memory 176 every minute. By making reference to such historical tilt information in the memory 176, the tilt time is easily obtained by counting the number of result data which have the value "1". For example, if there is only one result datum which has the value "1", the system determines that the tilt time was less than a minute. If there are two, the tilt time was not less than one minute and less than two minutes, and if there are ten, the tilt time was not less than nine minutes and less than ten minutes.

Then, the system checks if the tilt time was not shorter than the first predetermined value (e.g. 1440 hours) (Step S57). If the tilt time is shorter than the first predetermined value, the CPU 172 selects a recovery mode as the start-up mode, starts the fuel cell 104 in the recovery mode (Step S59), and the process comes to an end.

On the other hand, if Step S53 finds that there is no record of a tilt which is not smaller than the predetermined limit (if there is no result data which has the value "1" in the memory 176), the CPU 172 selects a normal mode as the start-up mode, starts the fuel cell 104 in the normal mode (Step S61), and the process comes to an end. If the Step S57 finds that the tilt time was not shorter than the first predetermined value, the system does not start the fuel cell 104, makes an error indication in the display portion 30*b* (Step S63), and the process comes to an end.

It should be noted here that there may be an arrangement for a case in which the fuel cell system 100 rolled over two or more times in the low consumption mode; in which case the tilt time may be obtained only for the last rollover, i.e., the last tilt not smaller than the predetermined limit, and the stand-by time may be obtained based on the tilt time.

Figure 17:
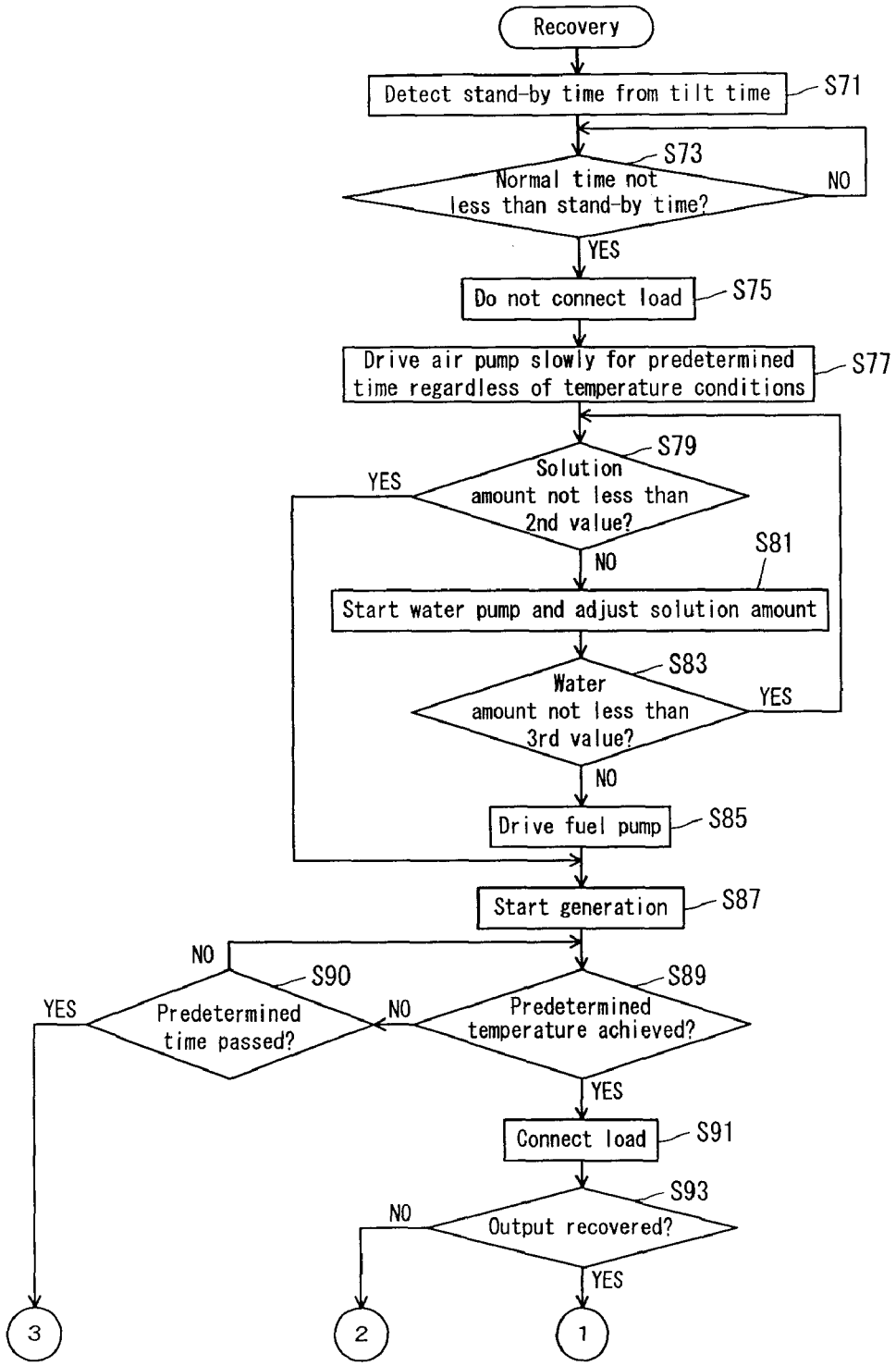
FIG. 17 is a flowchart showing an example of recovery mode operation in a preferred embodiment of the present invention.
Figure 18:
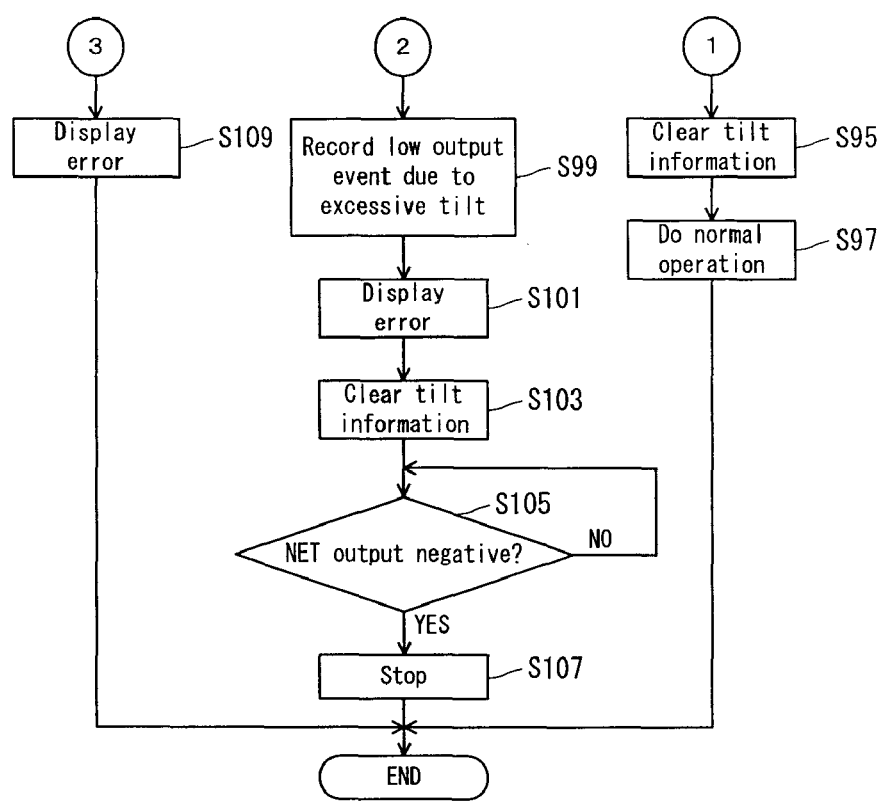
FIG. 18 is a flowchart showing a continued portion of the operation from FIG. 17.

Now, description will cover an operation in the recovery mode, with reference to FIG. 17 and FIG. 18.

First, the system obtains the stand-by time from the tilt time that was obtained in Step S55 during the check mode (Step S71). In the present preferred embodiment, the system makes reference to table data shown in FIG. 12 stored in the memory 176, and selects a stand-by time that corresponds to the tilt time. Then the system checks if a normal time, which is the amount of time lapsed from the last time of detection that the tilt of the fuel cell system 100 was no longer not smaller than the predetermined limit to the current point of time, is not shorter than the stand-by time (Step S73). The system waits until the normal time reaches the stand-by time. Once the normal time reaches the stand-by time, the system advances the process to Step S75.

Once the normal time is not smaller than the stand-by time as described, it is then possible to restore normal separation between liquid and gas in the aqueous solution tank 130, the water tank 132, etc. where the separation depends on gravity.

If liquid gets into the air pump 148, the liquid acts as a resistance to the pump operation, causing such a problem as pump burning. If air flows in the aqueous solution pump 146, the trapped air will disable the supply of aqueous solution. For these reasons, gas/liquid separation must also be made reliably for pumps and the like. Once the normal time becomes not shorter than the stand-by time, gas/liquid separation can then be made reliably in the pumps and the like. In addition, the electrolyte film 104*a* that became dry is wetted again, back to a normal situation.

Then, in Step S75, the fuel cell 104 is not connected with the loads, i.e. the electric motor 60 and the secondary battery 134 (Step S75). Thereafter, the air pump 148 is operated at a reduced output, at about 15% to about 20% of its normal output, for a predetermined period of time regardless of the temperature condition (Step S77). The operation promotes discharge of water or aqueous methanol solution that was trapped in the cathode 104*c* due to the rollover. Further, the operation of the air pump 148 at a reduced output prevents such a problem that too much power is spent for driving the air pump 148, which will cause system shutdown due to over current.

Then, the CPU 172 checks if the amount of aqueous solution in the aqueous solution tank 130 is not smaller than the second predetermined value (1000 cc, for example), based on a result of detection by the level sensor 131 (Step S79). If the amount of aqueous solution is smaller than the second predetermined value, the water pump 160 is driven to adjust the amount of aqueous solution (Step S81), and the CPU 172 checks if the amount of liquid in the water tank 132 is not smaller than the third predetermined value (750 cc for example), based on a result of detection by the level sensor 133 (Step S83). If the amount of liquid in the water tank 132 is not smaller than the third predetermined value, the process goes back to Step S79. The above-described cycle is repeated until the amount of aqueous solution in the aqueous solution tank 130 reaches or exceeds the second predetermined value. Once the amount of aqueous solution in the aqueous solution tank 130 reaches or exceeds the second predetermined value, the aqueous solution pump 146 and the air pump 148 are driven to start power generation (Step S87). On the other hand, if the amount of aqueous solution in the aqueous solution tank 130 cannot be recovered sufficiently by the supply of water from the water tank 132, Step S83 will find that the amount of liquid in the water tank 132 is smaller than the third predetermined value. In this case, the fuel pump 136 is driven to supply methanol fuel into the aqueous solution tank 130 to make highly concentrated aqueous methanol solution (Step S85), and power generation is started (Step S87). Power generation is started in this way and by circulating the highly concentrated methanol fuel, methanol crossover is promoted, and methanol that has crossed over is decomposed into water and carbon dioxide at the cathode 104c, and the water is stored in the water tank 132.

Then, a temperature detected by the second temperature sensor 170 for example, is taken as the temperature of the cell stack 102, and the CPU 172 checks if the temperature has reached a predetermined temperature (about 50° C., for example) (Step S89). If the predetermined temperature has not been reached, the system waits in Step S90 for the predetermined temperature to be reached, until a predetermined period of time has passed. Once the predetermined temperature is reached, the fuel cell 104 is connected with its loads, i.e. with the electric motor 60 and the secondary battery 134, to tap electric power from the fuel cell 104 (Step S91), whereby charging the secondary battery 134 is started. During the operation, the system measures the voltage of the fuel cell 104 to see if its output has recovered (Step S93). Whether the output has recovered or not is determined by checking, for example, if the output of the fuel cell 104 is not lower than about 80% of a predetermined output value. Alternatively, an output value right before the rollover may be stored, and the recovery of output may be determined once the output becomes not lower than the stored value.

Once the system finds that the output has recovered, the system clears the tilt information (Step S95), shifts to the normal operation (Step S97), and the process comes to an end.

On the other hand, if Step S93 finds that the output has not recovered, the event that a tilt not smaller than a predetermined limit has caused a decrease in the output is recorded in the memory 176 (Step S99), the system provides an error indication in the display portion 30b (Step S101), and clears the tilt information (Step S103). The system then checks if a NET output has become negative (Step S105). If power generation has been continued until the NET output has become negative and the system finds that the NET output is negative, power generation is stopped (Step S107) and the process comes to an end.

The NET output is an output obtained by subtracting the amount of power consumed by the system components such as the air pumps 148, from the output (gross output) of the fuel cell 104. When power consumption by the system components exceeds the gross output, the NET output becomes negative and it becomes impossible to charge. Therefore, the power generation is stopped.

Once the predetermined period of time has passed in Step S90, the system provides an error indication in the display portion 30b (Step S109), and the process comes to an end.

Figure 19:
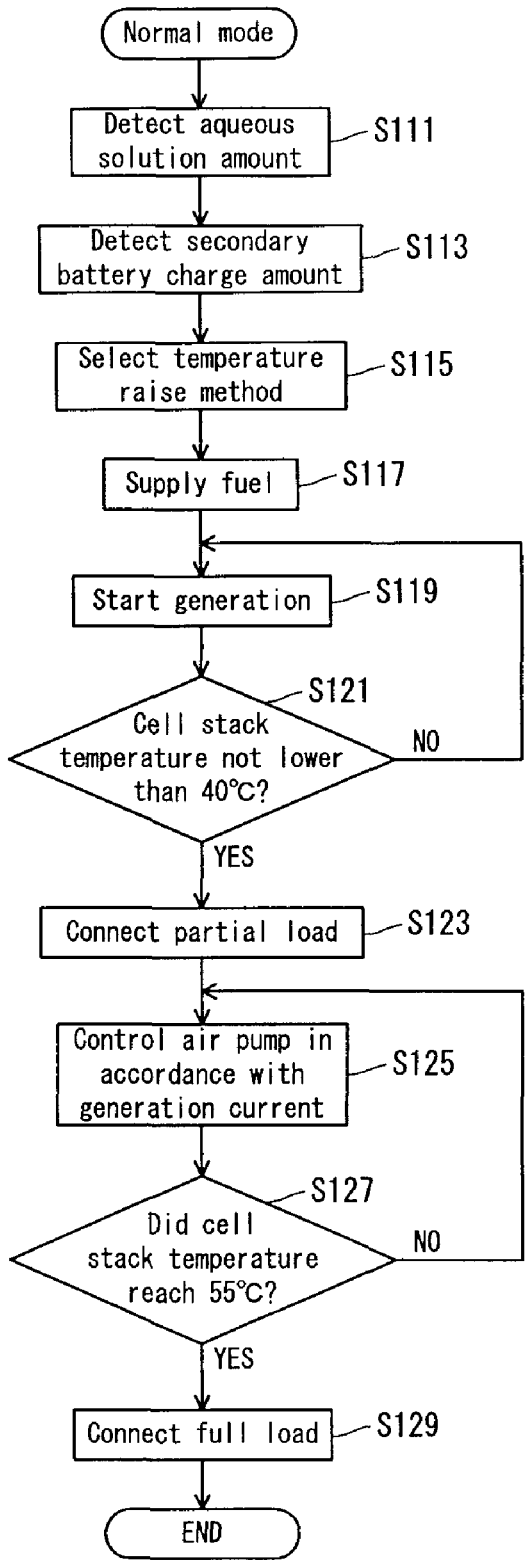
FIG. 19 is a flowchart showing an example of normal mode operation in a preferred embodiment of the present invention.

Next, description will cover an operation in the normal mode, with reference to FIG. 19.

First, the CPU 172 obtains the amount of aqueous methanol solution in the aqueous solution tank 130 based on a result of detection by the level sensor 131 (Step S111), the charge amount detector 65 detects the amount of charge in the secondary battery 134 (Step S113), and the system selects a temperature rising method based on the amount of aqueous solution and the amount of charge (Step S115).

Then, the fuel pump 136 is driven thereby supplying methanol fuel to the aqueous solution tank 130 (Step S117). Thereafter, the aqueous solution pump 146 and the air pump 148 are driven, whereby power generation is started (Step S119), and the system checks if the temperature in the cell stack 102 is not lower than about 40° C. (Step S121). The process goes back to Step S119 and continues to drive the air pump 148 until the temperature of the cell stack 102 reaches or exceeds about 40° C. Once the temperature of the cell stack 102 reaches or exceeds about 40° C., the system operates with partial load connection (Step S123). A reason why the system operates with partial load connection is that connecting with the full load when the temperature is low will decrease the performance.

The amount of air required changes depending on the power generation current. Therefore, the air pump 148 is controlled in accordance with the power generation current (Step S125), and the system checks if the temperature of the cell stack 102 has reached about 55° C. (Step S127). The process goes back to Step S125 and the air pump 148 is controlled in accordance with the power generation current until the temperature of the cell stack 102 reaches about 55° C. Once the temperature of the cell stack 102 reaches about 55° C., the system operates at the full load (Step S129), and the process comes to an end.

According to the fuel cell system 100 as described, it is possible to start the fuel cell 104 reliably even after a tilt not smaller than a predetermined limit was present, by starting the system in the recovery mode if the memory 176 has a record of the tilt not smaller than a predetermined limit (result data which has a value "1").

Also, by stopping the operation of fuel cell 104 when the fuel cell system 100 is tilted to or beyond a predetermined limit, it becomes possible to prevent risks that accompany continued power generation when the fuel cell system 100 is tilted to or beyond the predetermined limit.

Further, if a tilt not smaller than a predetermined limit continues for a long time, the system will not start, enabling to protect the electrolyte film 104a.

Also, by driving the air pump 148 in the recovery mode, it becomes possible to promote discharging of water that was trapped in the cathode 104c from the cathode 104c. In the normal operation, the air pump 148 is controlled in accordance with the temperature of the fuel cell 104. However, the air pump 148 is driven continuously in the recovery mode for a predetermined period of time regardless of the temperature condition, promoting discharge of unnecessary water from the cathode 104c.

Further, if the amount of liquid in the aqueous solution tank 130 is decreased to an insufficient level, it is possible to return water from the water tank 132 to the aqueous solution tank 130, thereby recovering the amount of liquid in the aqueous solution tank 130.

Also, by raising the concentration of the aqueous methanol solution supplied to the fuel cell 104, the amount of crossover during power generation is increased. This enables to increase the amount of liquid discharged from the cathode 104c and to increase the amount of liquid in the water tank 132. This is particularly effective when there is a shortage in the amount of water in the water tank 132 due to the recycling operation of water from the water tank 132 to the aqueous solution tank 130.

Further, tilt detection of the fuel cell system 100 is made less frequently while the power generation is stopped than while the power generating operation is underway. This enables to decrease power consumption when the power generation is stopped.

Transportation equipment that includes a fuel cell system 100 sometimes tilts to or beyond a predetermined limit. The motorbike 10, in particular, can easily rollover. Therefore, the present invention is suitable for a motorbike 10, and further for transportation equipment such as marine vessels, which includes a fuel cell system 100.

The present invention is applicable not only to transportation equipment but also to electronic instruments. Further, the present invention is applicable to any systems of all sizes, large and small, whether they are stationary or portable.

The preferred embodiments described above preferably use methanol as the fuel and aqueous methanol solution as the aqueous fuel solution. However, the present invention is not limited to this. For example, the fuel may be provided by alcohol fuel such as ethanol with the aqueous fuel solution being provided by aqueous alcohol solution such as aqueous ethanol solution.

Further, the present invention is applicable to systems in which hydrogen gas is supplied to the fuel cell.

The tilt detector may include other components such as a gyroscopic instrument, and a contact switch arranged to detect contact with a contact surface.

In the preferred embodiments described above, a tilt not smaller than a predetermined limit is recognized when a situation in which the fuel cell system 100 is tilted beyond a threshold is detected successively for a predetermined amount of time. However, the present invention is not limited to this. For example, the presence of a tilt not smaller than a predetermined limit may be recognized once the tilt of fuel cell system 100 exceeds a threshold.

Also, the tilt time may be measured in real time based on a clock from the clock circuit 174.

Figure 16:
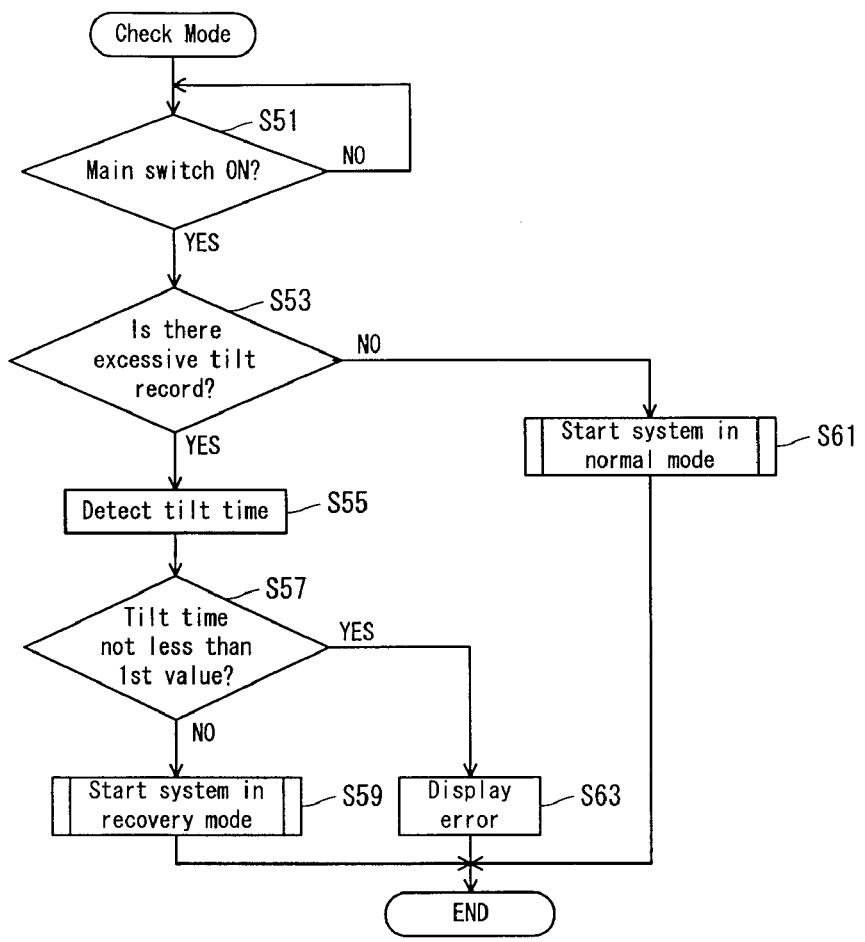
FIG. 16 is a flowchart showing an example of check mode operation in a preferred embodiment of the present invention.

Further, if there is a record of a tilt not smaller than the predetermined limit in Step S53 shown in FIG. 16, the process may skip Steps S55 and S57 and go directly to Step S59 to start the fuel cell 104 in the recovery mode.

The present invention being thus far described and illustrated in detail, it is obvious that these description and drawings only represent examples of preferred embodiments of the present invention, and should not be interpreted as limiting the present invention. The spirit and scope of the present invention is only limited by words used in the accompanied claims.

What is claimed is:

1. A fuel cell system comprising:
   a fuel cell including an anode and a cathode;
   a tilt detector arranged to detect a tilt of the fuel cell system;
   a storage device arranged to store a time record of tilt information representing a past result of detection by the tilt detector; and
   a controller programmed to start the fuel cell in one of a plurality of start-up modes including a normal mode and a recovery mode based on the time record of tilt information stored in the storage device; wherein
   starting conditions of the fuel cell in the recovery mode are different from starting conditions of the fuel cell in the normal mode.

2. The fuel cell system according to claim 1, wherein the controller is programmed to control operation of the fuel cell based on the past result of detection by the tilt detector.

3. The fuel cell system according to claim 1, further comprising a time detector arranged to detect a tilt time of how long the fuel cell system was tilted not smaller than a predetermined limit, wherein the controller is programmed to control starting of the fuel cell in one of the normal mode and the recovery mode based on the tilt time.

4. The fuel cell system according to claim 1, further comprising an instruction unit programmed to issue a power generation start instruction, wherein the controller is programmed to start power generation at least after a predetermined period of stand-by time following an issuance of the power generation start instruction from the instruction unit when starting the fuel cell in the recovery mode.

5. The fuel cell system according to claim 4, wherein the predetermined period of stand-by time changes depending on how long the fuel cell system was tilted not smaller than the predetermined limit.

6. The fuel cell system according to claim 1, wherein the controller is programmed to start power generation at least after a predetermined period of stand-by time following a most recent detection by the tilt detector of an event that the tilt of the fuel cell system has no longer been not smaller than a predetermined limit when starting the fuel cell in the recovery mode.

7. The fuel cell system according to claim 1, further comprising an air supply arranged to supply the cathode of the fuel cell with air which contains oxygen, wherein the controller is programmed to control the air supply so as to supply the cathode with the air continuously for a predetermined period of time before tapping electric power from the fuel cell when starting the fuel cell in the recovery mode.

8. The fuel cell system according to claim 7, wherein the controller is programmed to control the air supply so as to continuously supply the cathode with a less amount of air than during power generation for a predetermined period of time before tapping electric power from the fuel cell when starting the fuel cell in the recovery mode.

9. The fuel cell system according to claim 1, further comprising:
   a water reservoir arranged to store water discharged from the cathode of the fuel cell;
   an aqueous solution reservoir connected with the water reservoir and arranged to store aqueous fuel solution supplied to the fuel cell;
   a water supply arranged to supply the water from the water reservoir to the aqueous solution reservoir; and
   an aqueous solution amount detector arranged to detect an amount of liquid in the aqueous solution reservoir; wherein
   the controller is programmed to control operation of the water supply based on the amount of liquid in the aqueous solution reservoir when starting the fuel cell in the recovery mode.

10. The fuel cell system according to claim 9, wherein the controller is programmed to supply water to the aqueous solution reservoir when starting the fuel cell in the recovery mode.

11. The fuel cell system according to claim 1, further comprising a water reservoir arranged to store water discharged from the cathode of the fuel cell, and a liquid amount detector arranged to detect an amount of liquid in the water reservoir;
   wherein the controller is programmed to control a concentration of aqueous fuel solution supplied to the fuel cell based on the amount of liquid in the water reservoir when starting the fuel cell in the recovery mode.

12. The fuel cell system according to claim 11, wherein the controller is programmed to increase the concentration of the aqueous fuel solution supplied to the fuel cell when starting the fuel cell in the recovery mode.

13. The fuel cell system according to claim 1, wherein detection frequency of the tilt of the fuel cell system by the tilt detector is less while power generation is stopped than while power generation is underway.

14. Transportation equipment comprising the fuel cell system according to claim 1.

15. An electronic instrument comprising the fuel cell system according to claim 1.

16. A method of operating a fuel cell system including a fuel cell which has an anode and a cathode, the method comprising steps of:
 detecting a tilt of the fuel cell system;
 storing in a storage device a time record that the fuel cell system was tilted to or beyond a predetermined limit; and
 starting the fuel cell, thereafter, in a recovery mode when there is a time record of a tilt time of how long the fuel cell system was tilted not smaller than a predetermined limit in the storage device at the time of start-up; wherein starting conditions of the fuel cell in the recovery mode are different from starting conditions of the fuel cell in a normal mode.

17. The method of operating a fuel cell system according to claim 16, wherein the step of starting the fuel cell in the recovery mode includes the step of:
 starting power generation at least after a predetermined period of stand-by time following an issuance of a power generation start instruction.

18. The method of operating a fuel cell system according to claim 17, wherein the predetermined period of stand-by time changes depending on how long the fuel cell system was tilted not smaller than the predetermined limit.

19. The method of operating a fuel cell system according to claim 16, wherein the step of starting the fuel cell in the recovery mode includes the step of:
 supplying the cathode with air continuously for a predetermined period of time before tapping electric power from the fuel cell.

20. The method of operating a fuel cell system according to claim 16, wherein the step of starting the fuel cell in the recovery mode includes the step of:
 supplying water to an aqueous solution reservoir arranged to store aqueous fuel solution based on an amount of liquid in the aqueous solution reservoir.

21. The method of operating a fuel cell system according to claim 16, wherein the step of starting the fuel cell in the recovery mode includes the step of:
 increasing a concentration of aqueous fuel solution supplied to the fuel cell based on an amount of liquid in a water reservoir.

* * * * *